(12) United States Patent
Mihara

(10) Patent No.: US 8,446,511 B2
(45) Date of Patent: May 21, 2013

(54) IMAGE FORMING OPTICAL SYSTEM AND ELECTRONIC IMAGE PICKUP APPARATUS USING THE SAME

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 219 days.

(21) Appl. No.: 13/068,736

(22) Filed: May 17, 2011

(65) Prior Publication Data

US 2011/0292252 A1     Dec. 1, 2011

(30) Foreign Application Priority Data

May 25, 2010   (JP) .................................. 2010-119506

(51) Int. Cl.
  *H04N 5/225*   (2006.01)
  *G02B 15/14*   (2006.01)
  *G02B 9/34*    (2006.01)

(52) U.S. Cl.
  USPC ........................... 348/335; 359/676; 359/773

(58) Field of Classification Search
  USPC .................................. 348/335; 359/676, 773
  See application file for complete search history.

(56) References Cited

U.S. PATENT DOCUMENTS 6,342,972 B1 *   1/2002   Yamanashi ................... 359/686
7,423,813 B2 *   9/2008   Kamo ........................... 359/686

FOREIGN PATENT DOCUMENTS

| JP | 2007-108707 | 4/2007 |
| JP | 2007-108715 | 4/2007 |
| JP | 2008-191308 | 8/2008 |
| JP | 2008-191311 | 8/2008 |

* cited by examiner

Primary Examiner — James Hannett
(74) Attorney, Agent, or Firm — Kenyon & Kenyon LLP

(57) ABSTRACT

In an image forming optical system which includes in order from an object side, a first lens group G1 having a positive refractive power, a second lens group G2 having a negative refractive power, an aperture stop, a third lens group G3 having a positive refractive power, and a fourth lens group G4 having a negative refractive power, and in which, at the time of zooming, air distances between lens groups are variable, and an air lens nearest to an image side in the third lens group G3 has a shape of a convex lens, the fourth lens group G4 includes one lens component, and is movable even at the time of focusing, and satisfies the following conditional expressions $$0.5 < (R4F+R4R)/(R4F-R4R) < 8.0 \quad (1)$$

$$-12.0 < (R4LAF+R4LAR)/(R4LAF-R4LAR) < -2.0 \quad (2).$$

10 Claims, 19 Drawing Sheets

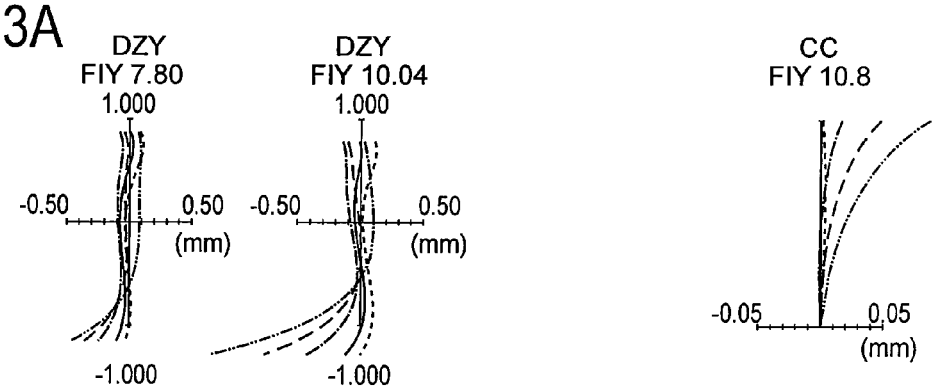
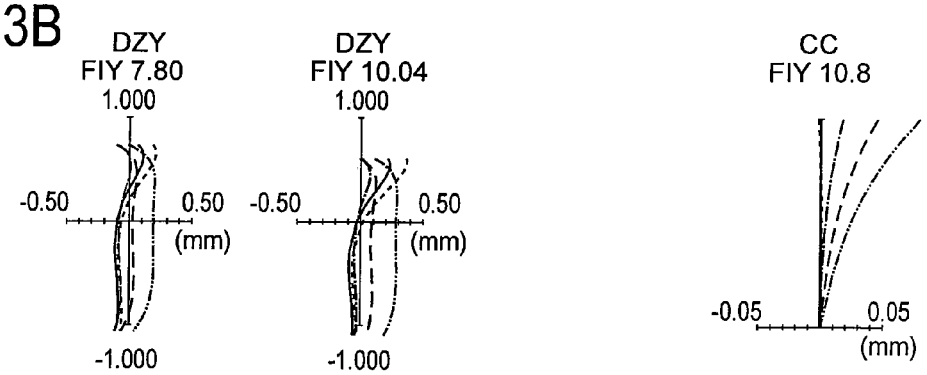
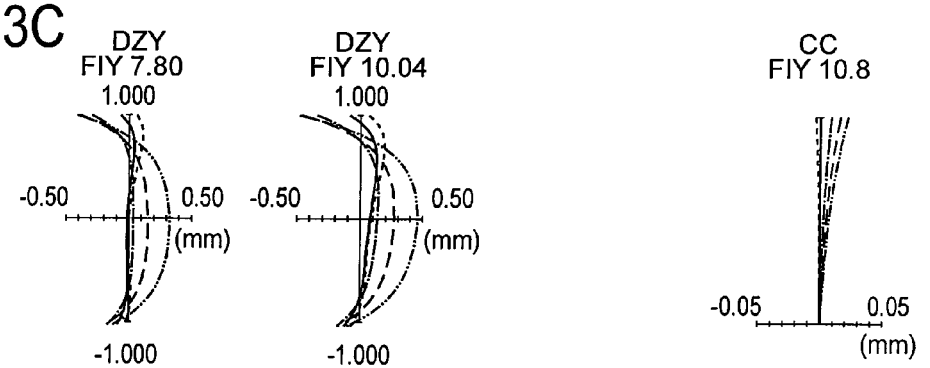

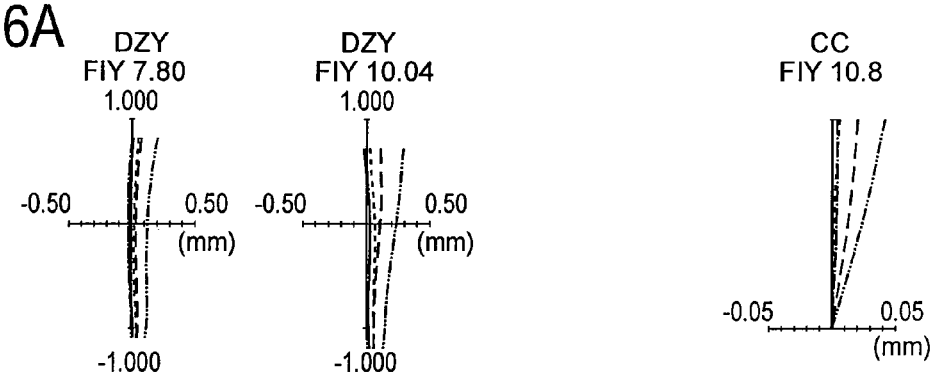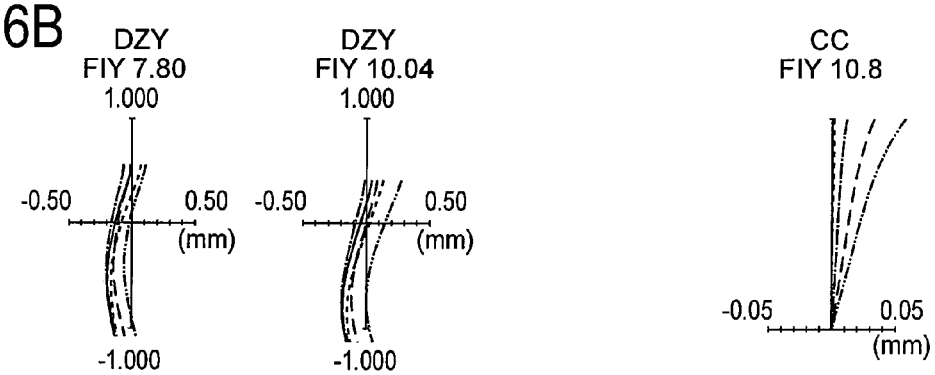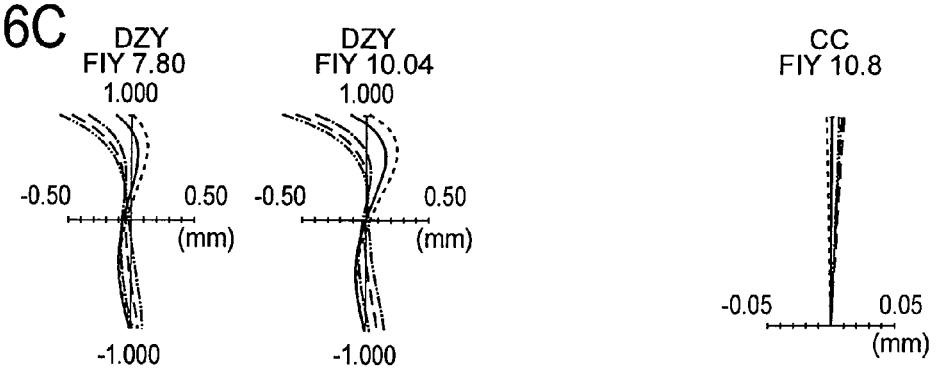

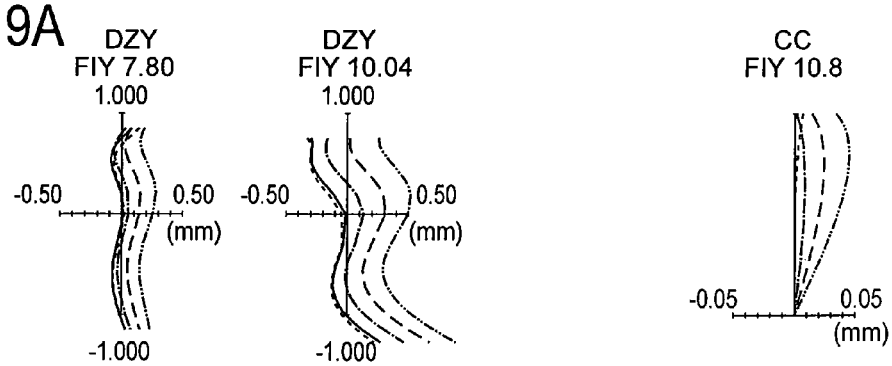
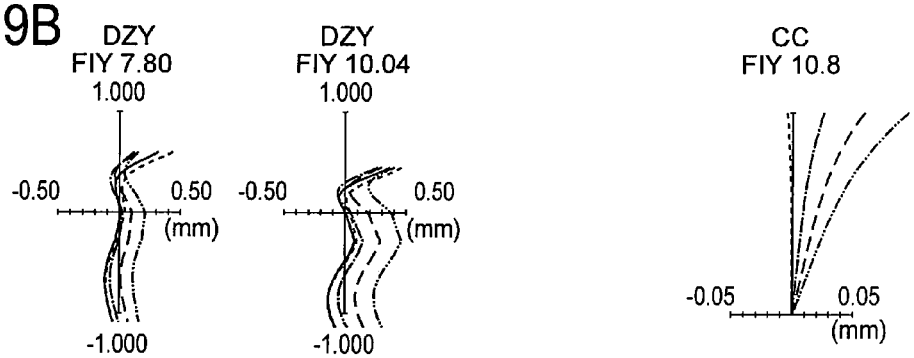
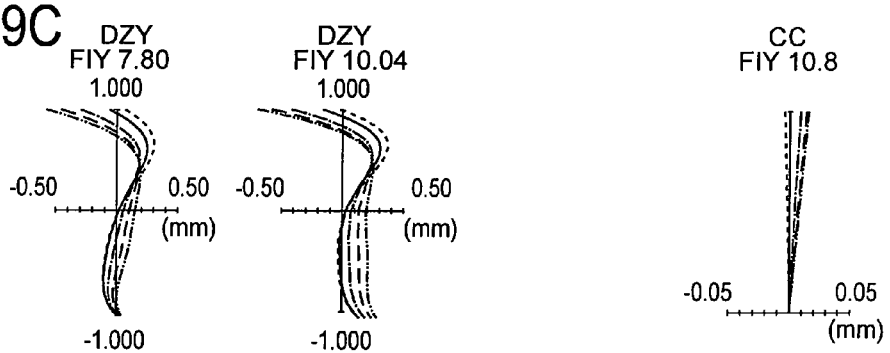

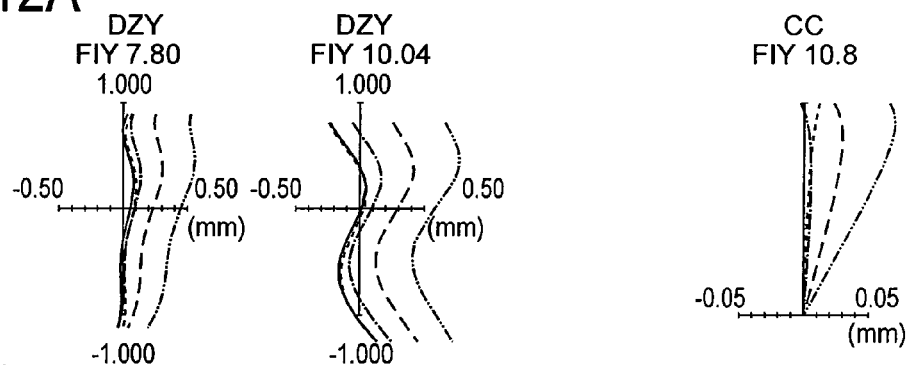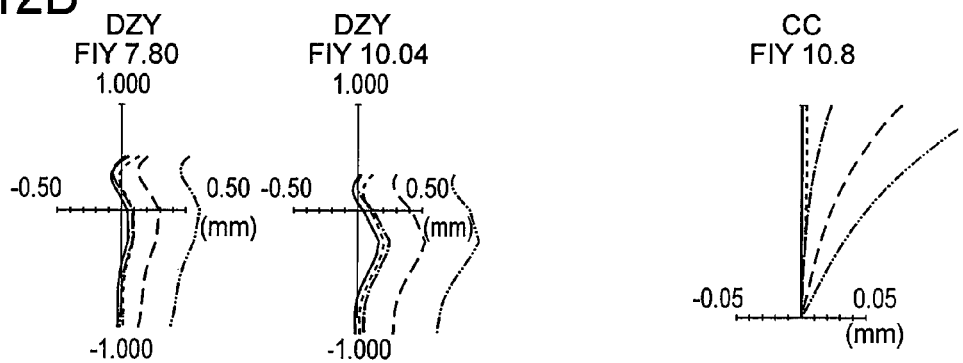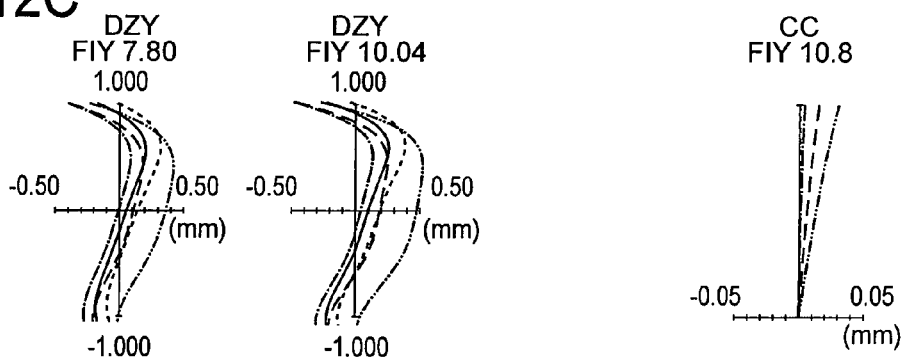

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2010-119506 filed on May 25, 2010; the entire contents of which are incorporated herein by reference.

BACKGROUND OF THE INVENTION

1. Field of the Invention

The present invention relates to an image forming optical system and an electronic image pickup apparatus using the same.

2. Description of the Related Art

In recent years, with an increase in the number of pixels of an image pickup element and the progress of a digital image processing technology, a digital camera has substituted a silver salt 35 mm film camera. Moreover, since the number of pixels of a small-size liquid crystal panel which is used as a finder has increased, even an interchangeable lens camera is undergoing transition from a so-called single-lens reflex camera to a camera of a new concept in which, a quick-return mirror has been eliminated.

Furthermore, since a capacity of a recording medium such as a flash memory and a bit rate of an image processing system has increased in units of digits, video recording of a high image quality is becoming possible. However, for small-sizing of a camera system while mounting a video function of an improved performance, it is necessary to make a focusing-drive portion light.

Lately, for making the focusing-drive portion in a zooming optical system as light as possible, a lens group of a rear portion of an optical system having a small diameter and a fewer number of lens components has been selected. Particularly, the lens group of the rear portion of the optical system includes only one lens component. However, in a camera in which, an image forming performance beyond a certain degree is sought from infinity to an object-point at a close distance, correction of a chromatic aberration, a coma aberration, and a meridional curvature of field is insufficient.

Therefore, for forming a focusing lens group by a plurality of lens components while maintaining a light weight of the focusing lens group, for a lens group more on an image side than an aperture stop, using a lens group which includes one component in which, a thin resin lens is cemented to a base-material lens as a focusing lens group as proposed in Japanese Patent Application Laid-open Publication Nos. 2007-108707, 2007-108715, 2008-191308, and 2008-191311, is to be taken into consideration.

SUMMARY OF THE INVENTION

An image forming optical system according to the present invention includes in order from an object side
a first lens group G1 having a positive refractive power,
a second lens group G2 having a negative refractive power,
an aperture stop,
a third lens group G3 having a positive refractive power, and
a fourth lens group G4 having a negative refractive power, and
at the time of zooming, air distances between the lens groups are variable, and an air lens nearest to an image side in the third lens group has a shape of a convex lens, and
the fourth lens group G4 includes one lens component, and is movable even at the time of focusing, and satisfies the following conditional expressions $$0.5 < (R4F + R4R)/(R4F - R4R) < 8.0 \quad (1)$$

$$-12.0 < (R4LAF + R4LAR)/(R4LAF - R4LAR) < -2.0 \quad (2)$$

where,
R4F denotes a radius of curvature on an optical axis of a surface nearest to an object side, of the fourth lens group G4,
R4R denotes a radius of curvature on an optical axis of a surface nearest to an image side, of the fourth lens group G4,
R4LAF denotes a radius of curvature on an optical axis of a surface on the object side of a positive lens LA which is cemented to the fourth lens group G4, and
R4LAR denotes a radius of curvature on an optical axis of a surface on the image side of the positive lens LA which is cemented to the fourth lens group G4.

Moreover, an electronic image pickup apparatus according to the present invention includes
the abovementioned image forming optical system,
an electronic image pickup element, and
an image processing unit which processes image data which has been obtained by picking up an image formed by the image forming optical system by the electronic image pickup element, and outputs as image data in which, a shape of the image has been changed, and
the image forming optical system is a zoom lens, and the zoom lens, at the time of infinite object point focusing, satisfies the following conditional expression $$0.70 < y_{07}/(fw \cdot \tan \omega_{07w}) < 0.96 \quad (13)$$

where,
$y_{07}$ is expressed as $y_{07} = 0.7 \cdot y_{10}$, when a distance (the maximum image height) from a center up to the farthest point on an effective image pickup surface (on a surface on which an image can be picked up) of the electronic image pickup element is let to be $y_{10}$,
$\omega_{07w}$ is an angle with respect to an optical axis in an object-point direction corresponding to an image point from a center on the image pickup surface up to a position of $y_{07}$, at a wide angle end, and
fw is a focal length of the overall image forming optical system at the wide angle end.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A, FIG. 3B, and FIG. 3C are diagrams showing a coma aberration of an off-axis light beam at the time of infinite object point focusing of the zoom lens according to the first embodiment, where, FIG. 3A shows a state at the wide angle end, FIG. 3B shows an intermediate state, and FIG. 3C shows a state at the telephoto end;

FIG. 4A shows a state at a wide angle end, FIG. 4B shows an intermediate state, and FIG. 4C shows a state at a telephoto end;

FIG. 5A shows a state at the wide angle end, FIG. 5B shows an intermediate state, and FIG. 5C shows a state at the telephoto end;

FIG. 6A, FIG. 6B, and FIG. 6C are diagrams showing a coma aberration of an off-axis light beam at the time of infinite object point focusing of the zoom lens according to the second embodiment, where, FIG. 6A shows a state at the wide angle end, FIG. 6B shows an intermediate state, and FIG. 6C shows a state at the telephoto end;

FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 9A, FIG. 9B, and FIG. 9C are diagrams showing a coma aberration of an off-axis light beam at the time of infinite object point focusing of the zoom lens according to the third embodiment, where, FIG. 9A shows a state at the wide angle end, FIG. 9B shows an intermediate state, and FIG. 9C shows a state at the telephoto end;

FIG. 10A shows a state at a wide angle end, FIG. 10B shows an intermediate state, and FIG. 10C shows a state at a telephoto end;

FIG. 11A shows a state at the wide angle end, FIG. 11B shows an intermediate state, and FIG. 11C shows a state at the telephoto end;

FIG. 12A, FIG. 12B, and FIG. 12C are diagrams showing a coma aberration of a off-axis light beam at the time of infinite object point focusing of the zoom lens according to the fourth embodiment, where, FIG. 12A shows a state at the wide angle end, FIG. 12B shows an intermediate state, and FIG. 12C shows a state at the telephoto end;

FIG. 19A is a front view of a mobile telephone 400, FIG. 19B is a side view of the mobile telephone 400, and FIG. 19C is a cross-sectional view of a photographic optical system 405.

DETAILED DESCRIPTION OF THE INVENTION

Figure 1A:
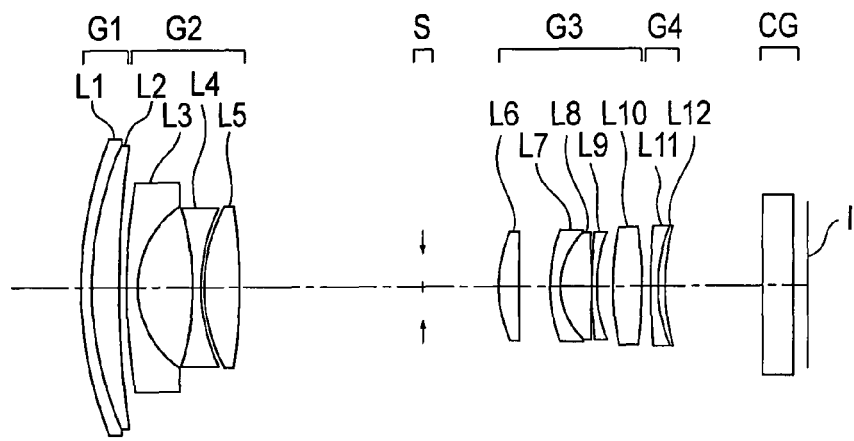
FIG. 1A, FIG. 1B, and FIG. 1C are cross-sectional views along an optical axis showing an optical arrangement at the time of infinite object point focusing of a zoom lens according to a first embodiment of the present invention, where.

Exemplary embodiments of an image forming optical system and an electronic image pickup apparatus according to the present invention will be described below in detail by referring to the accompanying diagrams. However, the present invention is not restricted to the embodiments described below.

Prior to the description of the embodiments, an action and an effect of the image forming optical system according to the embodiments will be described below. In the following description, a lens having a positive value of a paraxial focal length is let to be a positive lens and a lens having a negative value of a paraxial focal length is let to be a negative lens.

In the image forming optical system according to the embodiments, an image forming optical system which includes in order from an object side, a first lens group G1 having a positive refractive power, a second lens group G2 having a negative refractive power, an aperture stop, a third lens group G3 having a positive refractive power, and a fourth lens group G4 having a negative refractive power, and in which, at the time of zooming, air distances between the lens groups are variable, has been used.

Particularly, the fourth lens group G4 is let to be a lens group which moves for focusing, and furthermore, the fourth lens group G4 includes only one lens component. Accordingly, it is possible to make the lens group which moves for focusing, to be light weight. Moreover, for correcting aberrations which are degraded accordingly, particularly, a coma aberration and a meridional curvature of field, an air lens nearest to an image side in the third lens group G3 is let to have a shape of a convex lens. Moreover, the image forming optical system (the fourth lens group G4) satisfies the following conditional expressions.

$$0.5 < (R4F+R4R)/(R4F-R4R) < 8.0 \quad (1)$$

$$-12.0 < (R4LAF+R4LAR)/(R4LAF-R4LAR) < -2.0 \quad (2)$$

where,

R4F denotes a radius of curvature on an optical axis of a surface nearest to the object side, of the fourth lens group G4, R4R denotes a radius of curvature on an optical axis of a surface nearest to an image side, of the fourth lens group G4, R4LAF denotes a radius of curvature on an optical axis of a surface on the object side of a positive lens LA which is cemented to the fourth lens group G4, and R4LAR denotes a radius of curvature on an optical axis of a surface on the image side of the positive lens LA which is cemented to the fourth lens group G4.

When a range of any of conditional expressions (1) and (2) is surpassed, even when the air lens nearest to the image side in the third lens group G3 is let to have a shape of a convex lens, correction of the coma aberration and the meridional curvature of field over an entire area which can be focused, becomes difficult.

It is more preferable that the fourth lens group G4 satisfies the following conditional expression (1') instead of conditional expression (1).

$$1.5<(R4F+R4R)/(R4F-R4R)<5.0 \quad (1')$$

Furthermore, it is all the more preferable that the fourth lens group G4 satisfies the following conditional expression (1") instead of conditional expression (1).

$$1.8<(R4F+R4R)/(R4F-R4R)<4.0 \quad (1'')$$

It is more preferable that the fourth lens group G4 satisfies the following conditional expression (2') instead of conditional expression (2).

$$-9.0<(R4LAF+R4LAR)/(R4LAF-R4LAR)<-3.0 \quad (2')$$

Furthermore, it is all the more preferable that the fourth lens group G4 satisfies the following conditional expression (2") instead of conditional expression (2).

$$-7.0<(R4LAF+R4LAR)/(R4LAF-R4LAR)<-4.0 \quad (2'')$$

Moreover, it is preferable that a surface on the object side of the air lens nearest to the image side of the third lens group G3 is let to have a convex shape with a large curvature, and furthermore, satisfies the following conditional expression.

$$-8.0<(R3ALF+R3ALR)/(R3ALF-R3ALR)<-0.3 \quad (3)$$

where,

R3ALF denotes a radius of curvature on an optical axis of a surface on the object side of the air lens nearest to the image side, of the third lens group G3, and R3ALR denotes a radius of curvature on an optical axis of a surface on the image side of the air lens nearest to the image side, of the third lens group G3.

When a range of conditional expression (3) is surpassed, even when conditional expressions (1) and (2) are satisfied, correction of the coma aberration and the meridional curvature of field over an entire area which can be focused becomes difficult.

It is more preferable that the third lens group G3 satisfies the following conditional expression (3') instead of conditional expression (3).

$$-6.0<(R3ALF+R3ALR)/(R3ALF-R3ALR)<-0.6 \quad (3')$$

Furthermore, it is all the more preferable that the third lens group G3 satisfies the following conditional expression (3") instead of conditional expression (3).

$$-4.0<(R3ALF+R3ALR)/(R3ALF-R3ALR)<-0.9 \quad (3'')$$

Moreover, in the image forming optical system according to the present invention, it is preferable that the fourth lens group G4 includes a cemented lens component in which, a plurality of lenses including the positive lens LA are cemented, and in a rectangular coordinate system in which, a horizontal axis is let to be vd and a vertical axis is let to be nd, when a straight line expressed by $$nd=a \times vd+b \text{ (provided that } a=-0.0267)$$

is set, nd and vd of the positive lens LA are included in an area which is determined by a straight line when it is a lower limit value of a range of the following conditional expression (4) and a straight line when it is an upper limit value of the range of the following conditional expression (4), and an area determined by the following conditional expression (5).

$$2.00<b<2.40 \text{ (provided that } nd>1.45) \quad (4)$$

$$vd<26.0 \quad (5)$$

where, vd denotes Abbe's number (nd−1)/(nF−nC) for the positive lens LA, and nd, nC, nF denote refractive indices of the positive lens LA for a d-line, a C-line, and an F-line respectively.

When an upper limit value of conditional expression (4) is surpassed, correction of Petzval's sum is susceptible to be difficult, and correction of the meridional curvature of field becomes difficult.

When a lower limit value of conditional expression (4) is surpassed, correction of the coma aberration becomes difficult.

When an upper limit value of conditional expression (5) is surpassed, a fluctuation in a chromatic aberration due to focusing is susceptible to increase.

It is more preferable that the image forming optical system according to the present invention satisfies the following conditional expression (4') instead of conditional expression (4).

$$2.10<b<2.33 \quad (4')$$

Furthermore, it is all the more preferable that the image forming optical system according to the present invention satisfies the following conditional expression (4") instead of conditional expression (4).

$$2.20<b<2.29 \quad (4'')$$

It is more preferable that the image forming optical system according to the present invention satisfies the following conditional expression (5') instead of conditional expression (5).

$$vd<25.0 \quad (5')$$

Furthermore, it is all the more preferable that the image forming optical system according to the present invention satisfies the following conditional expression (5") instead of conditional expression (5).

$$vd<24.2 \quad (5'')$$

Moreover, in the image forming optical system according to the present invention, it is preferable that the fourth lens group G4 includes a cemented lens component in which, a plurality of lenses including the positive lens LA are cemented, and in a rectangular coordinate system in which, a horizontal axis is let to be vd and a vertical axis is let to be θgF, when a straight line expressed by $$\theta gF = \alpha \times vd + \beta \text{ (provided that } \alpha = -0.00566)$$

is set, θgF and vd of the positive lens LA in the fourth group G4 are included in both areas namely, an area determined by a straight line when it is a lower limit value of a range of the following conditional expression (6) and a straight line when it is an upper limit value of the range of the following conditional expression (6), and an area determined by the following conditional expression (5).

$$0.7200<\beta<0.8300 \quad (6)$$

$$vd<26 \quad (5)$$

where,

θgF denotes a partial dispersion ratio (ng−nF)/(nF−nC) of the positive lens LA,

νd denotes Abbe's number (nd−1)/(nF−nC) of the positive lens LA, and nd, nC, nF, and ng denote refractive indices of the positive lens LA for a d-line, a C-line, an F-line, and a g-line respectively.

When a glass material which surpasses an upper limit value of conditional expression (6) is used, correction of chromatic aberration of magnification due to a secondary spectrum, or in other words, the chromatic aberration of magnification for the g-line when achromatized for the F-line and the C-line, is not sufficient. Therefore, in an image which has been picked up, it is difficult to secure sharpness in a similar manner.

When a glass material which surpasses a lower limit value of conditional expression (6) is used, correction of longitudinal chromatic aberration due to the secondary spectrum, or in other words, the longitudinal chromatic aberration for the g-line when achromatized for the F-line and the C-line is not sufficient. Therefore, in an image which has been picked up, it is difficult to secure sharpness in a similar manner.

It is more preferable that the image forming optical system according to the present invention satisfies the following conditional expression (6') instead of conditional expression (6).

$$0.7400 < \beta < 0.8200 \quad (6')$$

Furthermore, it is all the more preferable that the image forming optical system according to the present invention satisfies the following conditional expression (6") instead of conditional expression (6).

$$0.7580 < \beta < 0.8100 \quad (6")$$

Moreover, in the image forming optical system according to the present invention, it is preferable that in a rectangular coordinate system other than the rectangular coordinate system with νd as a horizontal axis and θgF as a vertical axis, in which, the horizontal axis is let to be νd and the vertical axis is let to be θgh, when a straight line expressed by $$\theta hg = \alpha hg \times \nu d + \beta hg \text{ (provided that } \alpha hg = -0.00834)$$

is set, θhg and νd of the positive lens LA in the fourth lens group G4 are included in both areas namely, an area determined by a straight line when it is a lower limit value of a range of the following conditional expression (7) and a straight line when it is an upper limit value of the range of the following conditional expression (7), and an area determined by the following conditional expression (5).

$$0.7600 < \beta hg < 0.9000 \quad (7)$$

$$\nu d < 26 \quad (5)$$

where,

θhg denotes a partial dispersion ratio (nh−ng)/(nF−nC) of the positive lens LA, and nh denotes a refractive index of the positive lens LA for an h-line.

When a glass material which surpasses an upper limit value of conditional expression (7) is used, correction of chromatic aberration of magnification due to the secondary spectrum, or in other words, the chromatic aberration of magnification for the h-line when achromatized for the F-line and the C-line, is not sufficient. Therefore, in an image which has been picked up, chromatic spreading and chromatic flare of purple are susceptible to occur in a similar manner.

When a glass material which surpasses a lower limit value of conditional expression (7) is used, correction of longitudinal chromatic aberration due to the secondary spectrum, or in other words, the longitudinal chromatic aberration for the h-line when achromatized for the F-line and the C-line is not sufficient. Therefore, in an image which has been picked up, chromatic spreading and chromatic flare for purple are susceptible to occur in a similar manner.

It is more preferable that the image forming optical system according to the present invention satisfies the following conditional expression (7') instead of conditional expression (7).

$$0.7650 < \beta hg < 0.8700 \quad (7')$$

Furthermore, it is all the more preferable that the image forming optical system according to the present invention satisfies the following conditional expression (7") instead of conditional expression (7).

$$0.7680 < \beta hg < 0.8620 \quad (7")$$

Moreover, in the image forming optical system according to the present invention, it is preferable that the fourth lens group G4 includes a cemented lens component in which, only two lenses namely, the positive lens LA and a negative lens LB are cemented.

Moreover, in the image forming optical system according to the present invention, it is preferable that when a lens having a negative value of a paraxial focal length is let to be a negative lens, a lens LB to which, the positive lens LA is to be cemented is a negative lens, and satisfies the following conditional expression.

$$0.000 \leq \theta gF(LA) - \theta gF(LB) \leq 0.200 \quad (8)$$

where,

θgF(LA) denotes a partial dispersion ratio (ng−nF)/(nF−nC) of the positive lens LA, and θgF(LB) denotes a partial dispersion ratio (ng−nF)/(nF−nC) of the lens LB which is to be cemented.

When a glass material which surpasses an upper limit value of conditional expression (8) is used, correction of chromatic aberration of magnification due to the secondary spectrum, or in other words, the chromatic aberration of magnification for the g-line when achromatized for the F-line and the C-line, is not sufficient. Therefore, in an image which has been picked up, it is difficult to secure sharpness in a similar manner.

When a glass material which surpasses a lower limit value of conditional expression (8) is used, correction of longitudinal chromatic aberration due to the secondary spectrum, or in other words, the longitudinal chromatic aberration for the g-line when achromatized for the F-line and the C-line is not sufficient. Therefore, in an image which has been picked up, it is difficult to secure sharpness in a similar manner.

Moreover, it is more desirable that the negative lens satisfies the following conditional expression (8') instead of conditional expression (8).

$$0.050 \leq \theta gF(LA) - \theta gF(LB) \leq 0.150 \quad (8')$$

Furthermore, it is all the more preferable that the negative lens satisfies the following conditional expression (8") instead of conditional expression (8).

$$0.065 \leq \theta gF(LA) - \theta gF(LB) \leq 0.130 \quad (8")$$

Moreover, in the image forming optical system according to the present invention, it is preferable that when a lens having a negative value of a paraxial focal length is let to be a negative lens, a lens LB to which, the positive lens LA is to be cemented is a negative lens, and satisfies the following conditional expression.

$$0.000 \leq \theta hg(LA) - \theta hg(LB) \leq 0.300 \quad (9)$$

where,

θhg(LA) denotes a partial dispersion ratio (nh−ng)/(nF−nC) of the positive lens LA, and θhg(LB) denotes a partial dispersion ratio (nh−ng)/(nF−nC) of the lens LB which is to be cemented.

When a glass material which surpasses an upper limit value of conditional expression (9) is used, correction of chromatic aberration of magnification due to the secondary spectrum, or in other words, the chromatic aberration of magnification for the h-line when achromatized for the F-line and the C-line, is not sufficient. Therefore, in an image which has been picked up, chromatic spreading and chromatic flare of purple are susceptible to occur in a similar manner.

When a glass material which surpasses a lower limit value of conditional expression (9) is used, correction of longitudinal chromatic aberration due to the secondary spectrum, or in other words, the longitudinal chromatic aberration for the h-line when achromatized for the F-line and the C-line is not sufficient. Therefore, in an image which has been picked up, chromatic spreading and chromatic flare for purple are susceptible to occur.

Moreover, it is more desirable that the negative lens satisfies the following conditional expression (9') instead of conditional expression (9).

$$0.100 \leq \theta hg(LA) - \theta hg(LB) \leq 0.250 \quad (9')$$

Furthermore, it is all the more preferable that the negative lens satisfies the following conditional expression (9'') instead of conditional expression (9).

$$0.105 \leq \theta hg(LA) - \theta hg(LB) \leq 0.210 \quad (9'')$$

Moreover, in the image forming optical system according to the present invention, it is preferable that when a lens having a negative value of a paraxial focal length is let to be a negative lens, a lens LB to which the positive lens LA is to be cemented is a negative lens, and satisfies the following conditional expression.

$$\nu d(LA) - \nu d(LB) \leq -15 \quad (10)$$

where, $\nu d(LA)$ denotes Abbe's number $(nd-1)/(nF-nC)$ of the positive lens LA, and $\nu d(LB)$ denotes Abbe's number $(nd-1)/(nF-nC)$ of the lens LB which is to be cemented.

When an upper limit value of conditional expression (10) is surpassed, a fluctuation in the chromatic aberration due to focusing is susceptible to increase.

Incidentally, let us assume that an image of an object at infinity has been formed by an optical system having no distortion. In this case, since there is no distortion of the image which has been formed, the following relationship holds true.

$$f = y / \tan \omega \quad (11)$$

where, y is a height of an image point from an optical axis, f is a focal length of the image forming system, and ω is an angle with respect to an optical axis in an object-point direction corresponding to an image point from a center on an image pickup surface up to a position of y.

However, when there is a barrel distortion in the optical system, the following relationship holds true.

$$f > y / \tan \omega \quad (12)$$

In other words, when f and y are let to be constant values, ω assumes a large value.

Therefore, in an electronic image pickup apparatus, it is preferable to use intentionally an optical system having a large barrel distortion for a focal length near a wide angle end in particular. In this case, it is possible to achieve widening of an angle of field of the optical system, as the purpose is served without correcting the distortion.

However, an image of an object is formed on an electronic image pickup element, with a barrel distortion. Therefore, in the electronic image pickup apparatus, an arrangement has been made such that image data acquired by the electronic image pickup element is processed by image processing. In the image processing, the image data (shape of the image) is changed to correct the barrel distortion.

When such an arrangement is made, the image data which has been acquired finally is image data having a shape almost similar to the object. Therefore, based on this image data, the image of the object is to be output to a CRT (cathode ray tube) or a printer.

In this case, for the image forming optical system, it is preferable to use zoom lens which satisfies the following conditional expression (13) at the time of almost infinite object point focusing, namely, at the time of focusing at an object point which is infinite distance.

$$0.70 < y_{07}/(fw \cdot \tan \omega_{07w}) < 0.96 \quad (13)$$

where, $y_{07}$ is expressed as $y_{07} = 0.7 \cdot y_{10}$, when a distance (the maximum image height) from a center up to the farthest point on an effective image pickup surface (on a surface on which an image can be picked up) of the electronic image pickup element is let to be $y_{10}$, $\omega_{07w}$ is an angle with respect to an optical axis in an object-point direction corresponding to an image point from a center on the image pickup surface up to a position of $y_{07}$, at a wide angle end, and fw is a focal length of the overall image forming optical system at the wide angle end.

Conditional expression (13) is an expression in which, an amount of barrel distortion at a zoom wide angle end is regulated. When the zoom lens satisfies conditional expression (13), it is possible to fetch information of a wide angle of field without making the optical system thick. The image distorted to be barrel shaped is subjected to photoelectric conversion by the image pickup element, and becomes image data which is distorted to be barrel shaped.

The image data which is distorted to be barrel shaped is subjected to a process equivalent to a shape-change of an image electrically by the image processing unit which is a signal processing system of the electronic image pickup apparatus. When such an arrangement is made, even when image data which has been output finally from the image processing unit is reproduced by a display apparatus, the distortion is corrected and an image almost similar to a shape of the object is achieved.

Here, when an upper limit value of conditional expression (13) is surpassed, and particularly, a value close to 1 is assumed, an image in which, the distortion has been corrected favorably is achieved. Therefore, a small correction carried out by the image processing unit serves the purpose. However, it is difficult to widen the angle of field of the optical system while maintaining the small size of the optical system.

Whereas, when a lower limit value of conditional expression (13) is surpassed, in a case in which, an image distortion due to distortion of the optical system is corrected by the image processing unit, a rate of drawing in a direction of irradiation in a portion surrounding an angle of field becomes excessively large. As a result, in an image which has been picked up, degradation of sharpness in a portion surrounding the image becomes conspicuous.

In such manner, by the zoom lens satisfying conditional expression (13), small sizing and widening of angle (making an angle of field in a perpendicular direction with distortion to be 38° or more) become possible.

In the image forming optical system according to the present invention, it is preferable that the zoom lens satisfies the following conditional expression (13') instead of conditional expression (13).

$$0.80 < y_{07}/(fw \cdot \tan \omega_{07w}) < 0.95 \quad (13')$$

Furthermore, it is all the more preferable that the zoom lens satisfies the following conditional expression (13") instead of conditional expression (13).

$$0.84 < y_{07}/(fw \cdot \tan \omega_{07w}) < 0.94 \tag{13"}$$

Here, a glass material means a lens material such as glass and a resin. Moreover, for a cemented lens, a lens which has been selected appropriately from these glass materials is to be used.

Moreover, in the image forming optical system according to the present invention, it is preferable that the cemented lens includes a first lens and a second lens which are thin at a center of an optical axis, and that the first lens satisfies conditional expressions (1) and (2), or conditional expressions (3) and (2). When such an arrangement is made, a further improvement in a correction effect of various aberrations and a further slimming of lens groups can be anticipated.

Moreover, it is desirable that the cemented lens is a composite lens. It is possible to realize a composite lens by curing upon adhering closely a resin as a first lens to a surface of a second lens. By letting the cemented lens to be a composite lens, it is possible to improve a manufacturing accuracy. As a method of manufacturing a composite lens, molding is available. In molding, there is a method in which, a material of the first lens (such as an energy curable transparent resin) is brought in contact with the second lens, and the first lens material is adhered closely to the second lens material directly. This method is extremely effective for thinning a lens element.

Moreover, in a case of letting the cemented lens to be a composite lens, a glass, as the first lens, may be adhered closely to a surface of the second lens, and hardened. Glass, as compared to a resin, is advantageous from a point of resistance such as a light resistance and a chemical resistance. In this case, as properties of the first lens material, it is necessary that, a melting point and a transition point of the first lens material are lower than a melting point and a transition point of the material of the second lens. As a method of manufacturing a composite lens, molding is available. In molding, there is a method in which, the first lens material is brought in contact with the second lens, and the first lens material is adhered closely to the second lens directly. This method is extremely effective for thinning a lens element.

As an example of the energy curable resin, an ultraviolet-curing resin is available. In both the cases namely, a case in which the first lens is made of a resin and a case in which the first lens is made of glass, a surface treatment such as coating may be carried out in advance on a lens which becomes a base material. Moreover, when the second lens is thin, the second lens may be adhered closely to the first lens.

Moreover, it is preferable to dispose a prism in the image forming optical system. The prism is to be used for bending (reflecting) an optical path of the optical system. Particularly, when the image forming optical system is a zoom lens, it is possible to make a dimension of depth thin (to shorten an overall length). It is preferable to dispose the prism in a positive lens group which is first from the object side, or in a negative lens group.

Moreover, in the image forming optical system according to the present invention, it is preferable that the lens LA satisfies the following conditional expression (14).

$$1.58 < nd < 1.76 \tag{14}$$

where, nd denotes a refractive index of a medium of the lens LA.

When the lens LA satisfies conditional expression (14), correction of a spherical aberration and a correction of astigmatism can be carried out favorably.

It is more preferable that the lens LA satisfies the following conditional expression (14') instead of conditional expression (14).

$$1.62 < nd < 1.72 \tag{14'}$$

Furthermore, it is all the more preferable that the lens LA satisfies the following conditional expression (14") instead of conditional expression (14).

$$1.63 < nd < 1.68 \tag{14"}$$

Moreover, it is preferable that the image forming optical system according to the present invention is a zoom lens, and that relative distances on an optical axis between lens groups vary at the time of zooming. It is preferable to use the cemented lens in such image forming optical system (zoom lens).

Moreover, in a case of using the lens LA in the cemented lens, the lens LA is to be cemented to a lens LB. In this case, it is preferable to make a thickness of the lens LA at a center of the optical axis to be thinner than a thickness of the lens LB at the center of the optical axis. Moreover, it is preferable that a thickness t1 of the lens LA at the center of the optical axis satisfies the following conditional expression (15).

$$0.3 < t1 < 1.5 \tag{15}$$

By the thickness t1 of the lens LA satisfying conditional expression (15), it is possible to realize a small-size optical system. Moreover, in a case of making the lens LA by molding, it is possible to carry out stable molding.

It is more preferable that the thickness t1 of the lens LA satisfies the following conditional expression (15') instead of conditional expression (15).

$$0.4 < t1 < 1.2 \tag{15'}$$

Furthermore, it is all the more preferable that the thickness t1 of the lens LA satisfies the following conditional expression (15") instead of conditional expression (15).

$$0.5 < t1 < 1.0 \tag{15"}$$

It is preferable that at least one surface of the lens LA is an aspheric surface.

By an image forming optical system for an interchangeable lens still camera having a video function satisfying conditional expressions of the present invention mentioned above, and being provided with the abovementioned structural characteristics, it is possible to make a focusing lens group of the image forming optical system light-weight. Furthermore, it is possible to correct favorably the chromatic aberration, the coma aberration, and the meridional curvature of field. Moreover, in the electronic image pickup apparatus, by using the abovementioned image forming optical system, it is possible to realize a high-speed focusing, a reduction of consumption of electric power, and sharpening of image.

Embodiments

Four exemplary embodiments of the zoom lens will be described below.

Figure 1B:
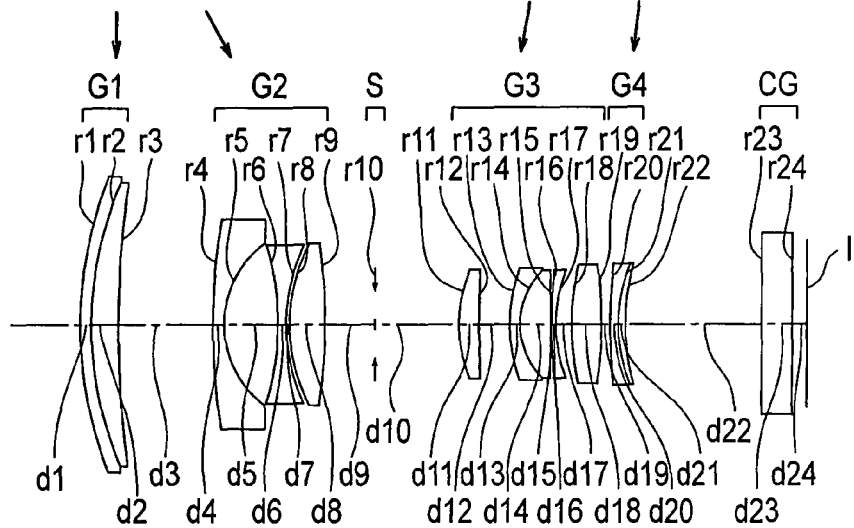
Figure 1C:
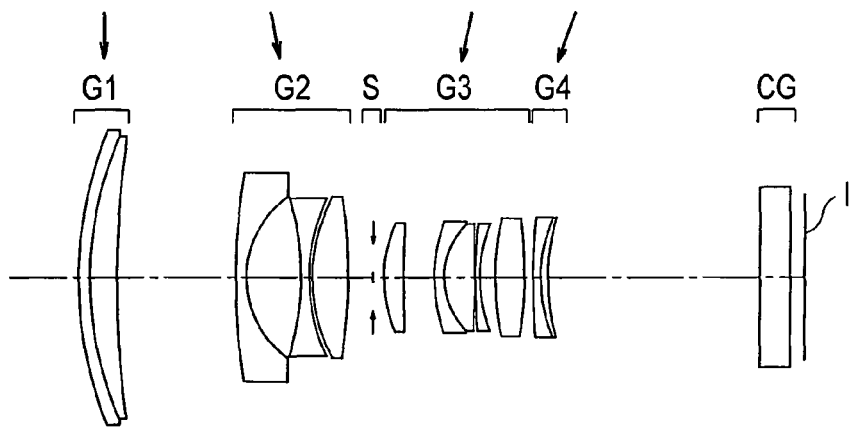

To start with, a zoom lens according to a first embodiment of the present invention will be described below. FIG. 1A, FIG. 1B, and FIG. 1C are cross-sectional views along an optical axis showing an optical arrangement at the time of infinite object point focusing of the zoom lens according to the first embodiment of the present invention, where, FIG. 1A shows a state at a wide angle end, FIG. 1B shows an intermediate focal length state, and FIG. 1C shows a state at a telephoto end.

Figure 2A:
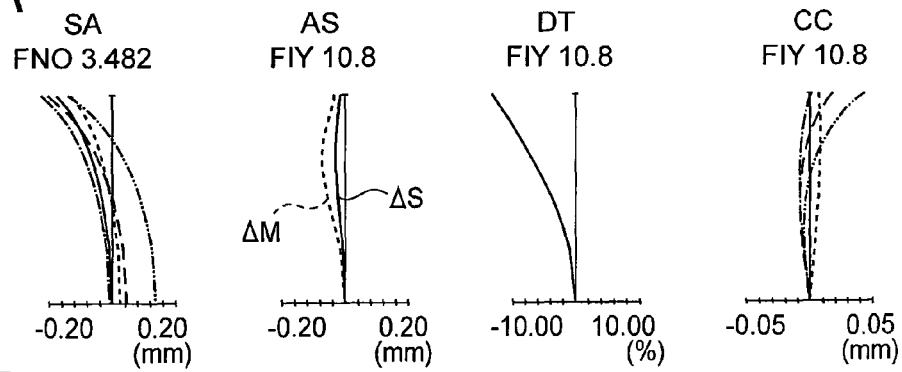
FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where.
Figure 2B:
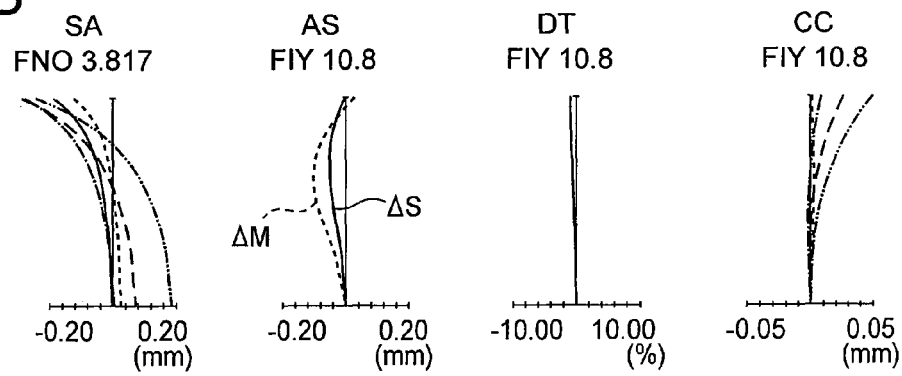
Figure 2C:
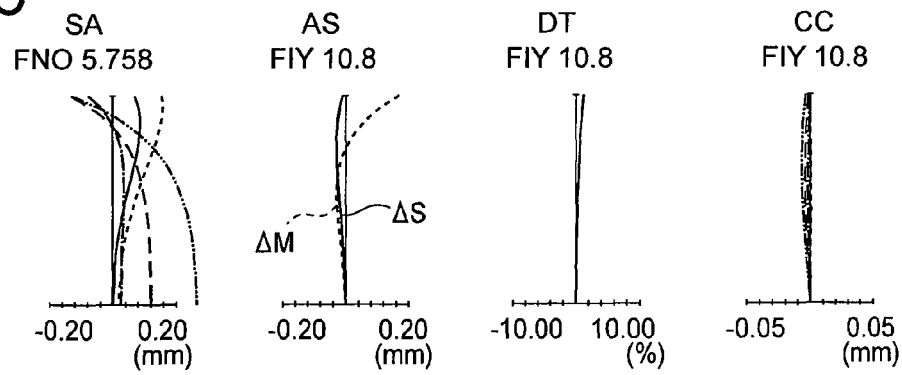

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens according to the first embodiment, where, FIG. 2A shows a state at the wide angle end, FIG. 2B shows an intermediate state, and FIG. 2C shows a state at the telephoto end.

FIG. 3A, FIG. 3B, and FIG. 3C are diagrams showing a coma aberration (longitudinal aberration) DZY of an off-axis beam at the time of infinite object point focusing of the zoom lens according to the first embodiment, where, FIG. 3A shows a state at the wide angle end, FIG. 3B shows an intermediate focal length state, and FIG. 3C shows a state at the telephoto end.

The zoom lens according to the first embodiment, as shown in FIG. 1A, FIG. 1B, and FIG. 1C, includes in order from an object side, a first lens group G1 having a positive refractive power, a second lens group G2 having a negative refractive power, an aperture stop S, a third lens group G3 having a positive refractive power, and a fourth lens group G4 having a negative refractive power. In all the embodiments which will be described below, in the lens cross-sectional views, CG denotes a cover glass which may have a low pass filter function, and I denotes an image pickup surface of an electronic image pickup element.

The first lens group G1 includes a cemented lens of a negative meniscus lens L1 having a convex surface directed toward the object side and a positive meniscus lens L2 having a convex surface directed toward the object side, in order from the object side, and has a positive refractive power as a whole.

The second lens group G2 includes in order from the object side, a negative meniscus lens L3 having a convex surface directed toward the object side, a biconcave negative lens L4, and a biconvex positive lens L5, and has a negative refractive power as a whole.

The third lens group G3 includes a positive meniscus lens L6 having a convex surface directed toward the object side, a cemented lens of a negative meniscus lens L7 having a convex surface directed toward the object side and a biconvex positive lens L8, a negative meniscus lens L9 having a convex surface directed toward the object side, and a biconvex positive lens L10, and has a positive refractive power as a whole.

The fourth lens group G4 includes a cemented lens of a negative meniscus lens L11 having a convex surface directed toward the object side and a positive meniscus lens L12 having a convex surface directed toward the object side, and has a negative refractive power as a whole.

The negative meniscus lens L11 corresponds to the lens LB according to the present invention, and the positive meniscus lens L12 corresponds to the lens LA according to the present invention.

At the time of zooming from the wide angle end to the telephoto end, the first lens group G1 is fixed. The second lens group G2 moves toward an image side. The third lens group G3 moves toward the object side. The fourth lens group G4 moves toward the object side.

An aspheric surface is provided to four surfaces namely, a surface on the object side of the biconcave negative lens L4 in the second lens group G2, and both surfaces of the positive meniscus lens L6 and a surface on the image side of the biconvex positive lens L8 in the third lens group G3.

Figure 4A:
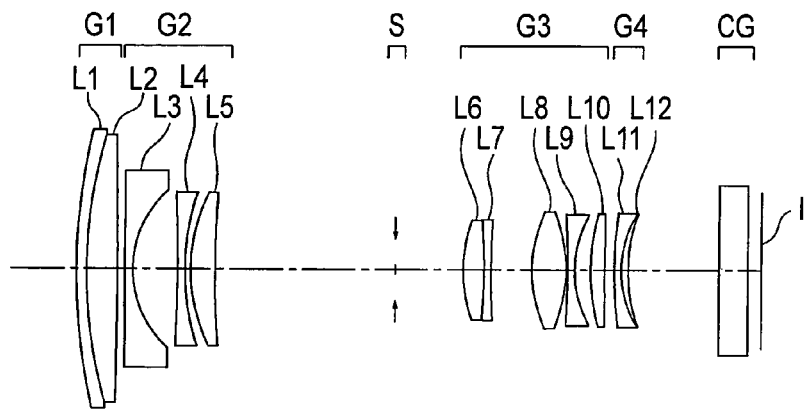
FIG. 4A, FIG. 4B, and FIG. 4C are cross-sectional views along an optical axis showing an optical arrangement at the time of infinite object point focusing of a zoom lens according to a second embodiment of the present invention, where.
Figure 4B:
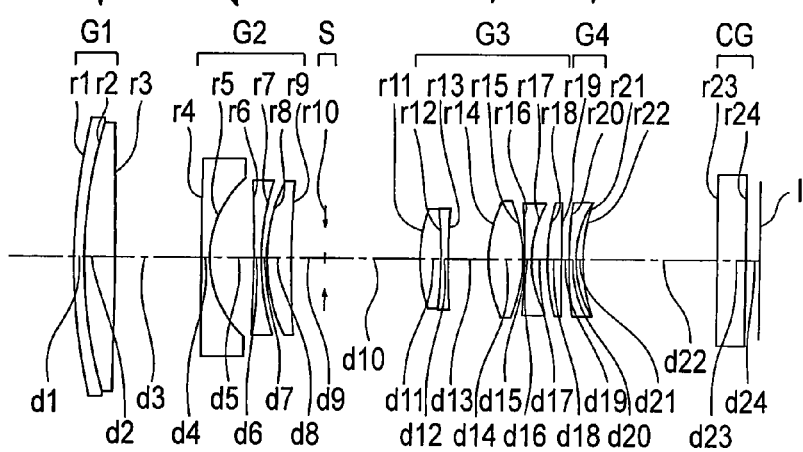
Figure 4C:
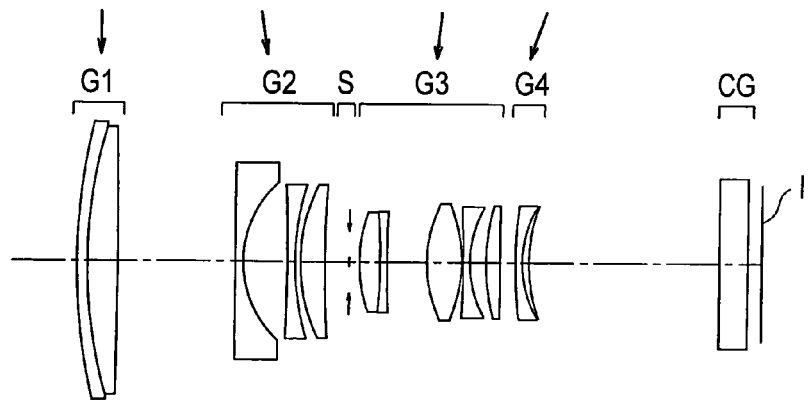

Next, a zoom lens according to a second embodiment of the present invention will be described below. FIG. 4A, FIG. 4B, and FIG. 4C are cross-sectional views along an optical axis showing an optical arrangement at the time of infinite object point focusing of the zoom lens according to the second embodiment of the present invention, where, FIG. 4A shows a state at a wide angle end, FIG. 4B shows an intermediate focal length state, and FIG. 4C shows a state at a telephoto end.

Figure 5A:
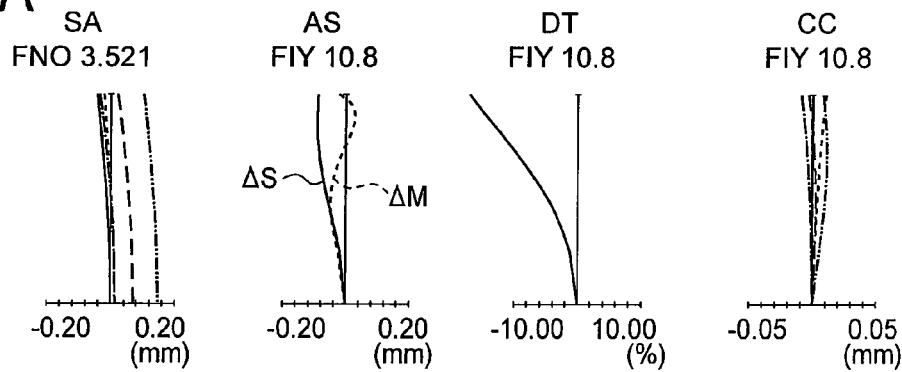
FIG. 5A, FIG. 5B, and FIG. 5C are diagrams showing a spherical aberration, an astigmatism, a distortion, and a chromatic aberration of magnification at the time of infinite object point focusing of the zoom lens according to the second embodiment, where.
Figure 5B:
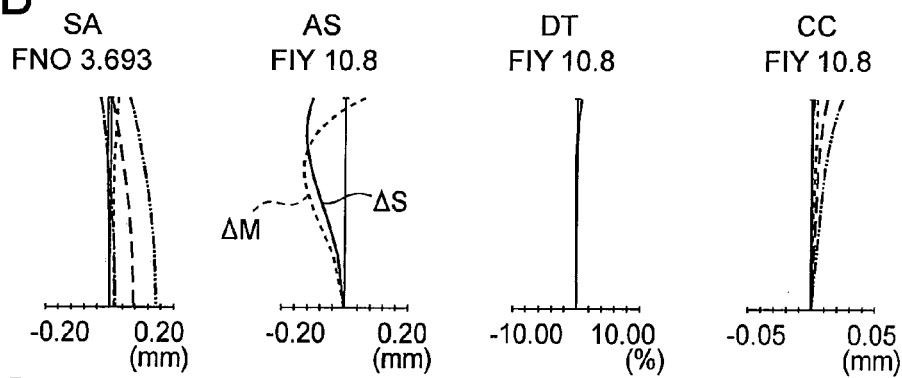
Figure 5C:
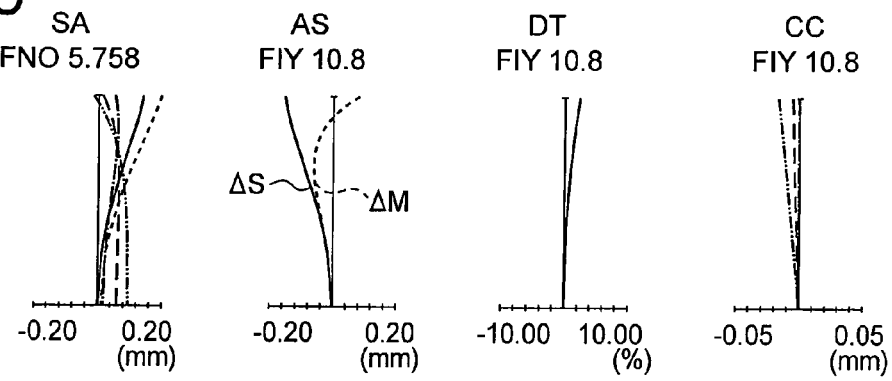

FIG. 5A, FIG. 5B, and FIG. 5C are diagrams showing a spherical aberration (SA), an astigmatism (AS), a distortion (DT), and a chromatic aberration of magnification (CC) at the time of infinite object point focusing of the zoom lens according to the second embodiment, where, FIG. 5A shows a state at the wide angle end, FIG. 5B shows an intermediate focal length state, and FIG. 5C shows a state at the telephoto end.

FIG. 6A, FIG. 6B, and FIG. 6C are diagrams showing a coma aberration (longitudinal aberration) DZY of an off-axis beam at the time of infinite object point focusing of the zoom lens according to the second embodiment, where, FIG. 6A shows a state at the wide angle end, FIG. 6B shows an intermediate focal length state, and FIG. 6C shows a state at the telephoto end.

The zoom lens according to the second embodiment, as shown in FIG. 4A, FIG. 4B, and FIG. 4C, includes in order from an object side, a first lens group G1 having a positive refractive power, a second lens group G2 having a negative refractive power, an aperture stop S, a third lens group G3 having a positive refractive power, and a fourth lens group G4 having a negative refractive power.

The first lens group G1 includes a cemented lens of a negative meniscus lens L1 having a convex surface directed toward the object side and a biconvex positive lens L2, in order from the object side, and has a positive refractive power as a whole.

The second lens group G2 includes in order from the object side, a negative meniscus lens L3 having a convex surface directed toward the object side, a biconcave negative lens L4, and a positive meniscus lens L5 having a convex surface directed toward the object side, and has a negative refractive power as a whole.

The third lens group G3 includes a cemented lens of a biconvex positive lens L6 and a biconcave negative lens L7, a biconvex positive lens L8, a biconcave negative lens L9, and a positive meniscus lens L10 having a convex surface directed toward the object side, and has a positive refractive power as a whole.

The fourth lens group G4 includes a cemented lens of a negative meniscus lens L11 having a convex surface directed toward the object side and a positive meniscus lens L12 having a convex surface directed toward the object side, and has a negative refractive power as a whole.

The negative meniscus lens L11 corresponds to the lens LB according to the present invention, and the positive meniscus lens L12 corresponds to the lens LA according to the present invention.

At the time of zooming from the wide angle end to the telephoto end, the first lens group G1 is fixed. The second lens group G2 moves toward an image side. The third lens group G3 moves toward the object side. The fourth lens group G4 moves toward the object side.

An aspheric surface is provided to five surfaces namely, a surface on the object side of the biconcave negative lens L4 in the second lens group G2, a surface on the object side of the biconvex positive lens L6 on the object side and both surfaces of the biconvex positive lens L8 in the third lens group G3, and a surface on the image side of the positive meniscus lens L12 in the fourth lens group G4.

Figure 7A:
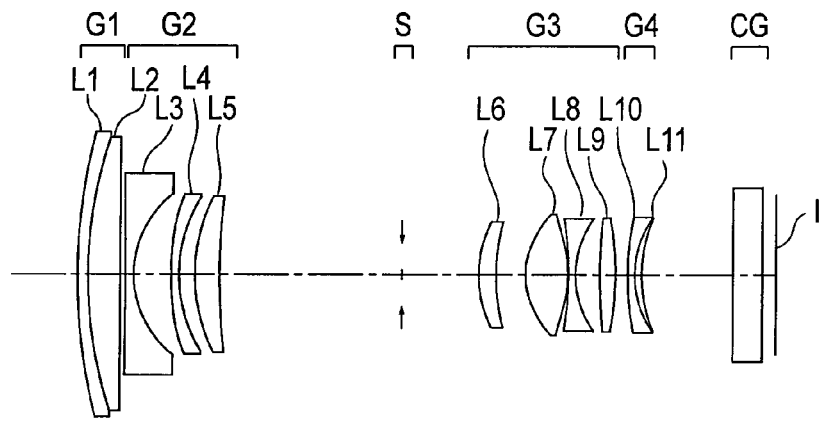
FIG. 7A, FIG. 7B, and FIG. 7C are cross-sectional views along an optical axis showing an optical arrangement at the time of infinite object point focusing of a zoom lens according to a third embodiment of the present invention, where.
Figure 7B:
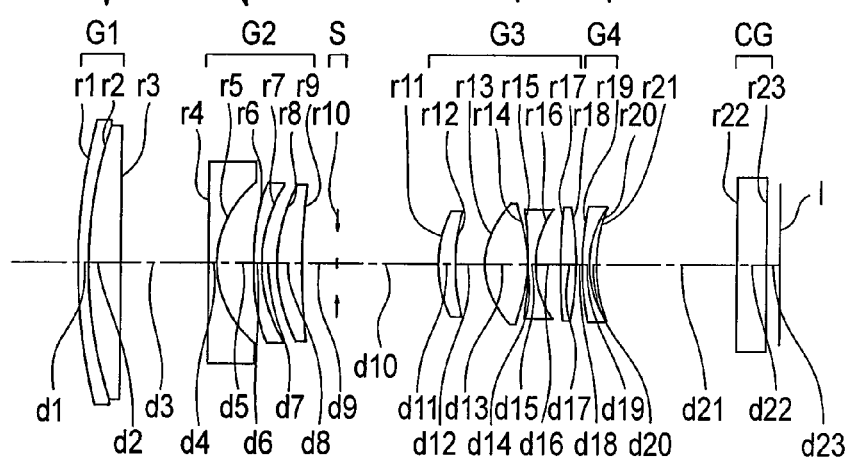
Figure 7C:
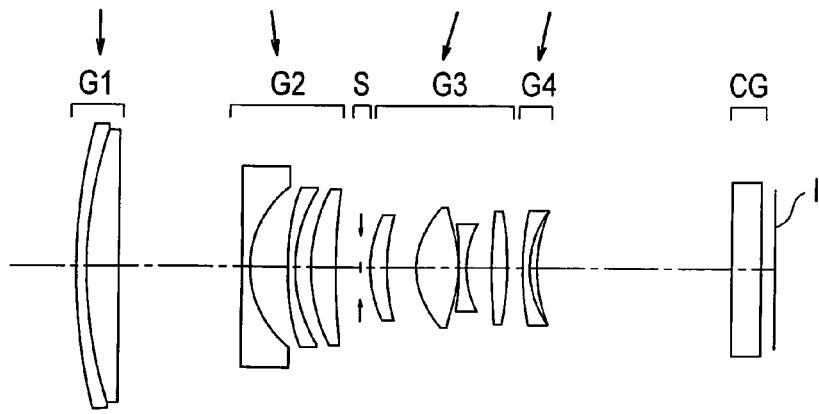

Next, a zoom lens according to a third embodiment of the present invention will be described below. FIG. 7A, FIG. 7B, and FIG. 7C are cross-sectional views along an optical axis showing an optical arrangement at the time of infinite object point focusing of the zoom lens according to the third embodiment of the present invention, where, FIG. 7A shows a state at a wide angle end, FIG. 7B shows an intermediate focal length state, and FIG. 7C shows a state at a telephoto end.

Figure 8A:
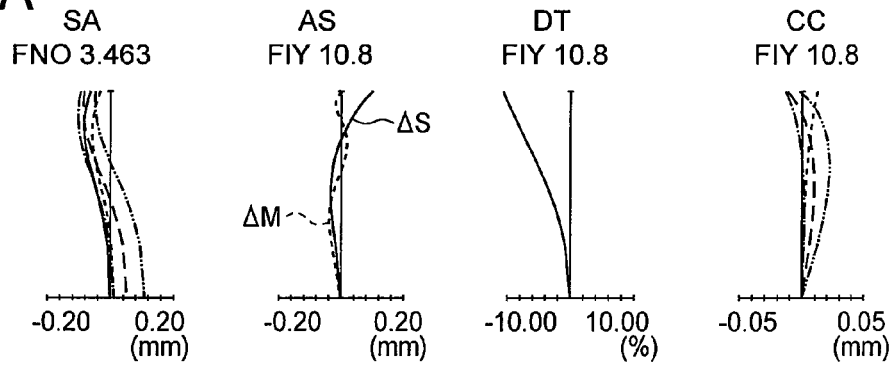
FIG. 8A, FIG. 8B, and FIG. 8C are diagrams showing a spherical aberration, an astigmatism, a distortion, and a chromatic aberration of magnification at the time of infinite object point focusing of the zoom lens according to the third embodiment, where.
Figure 8B:
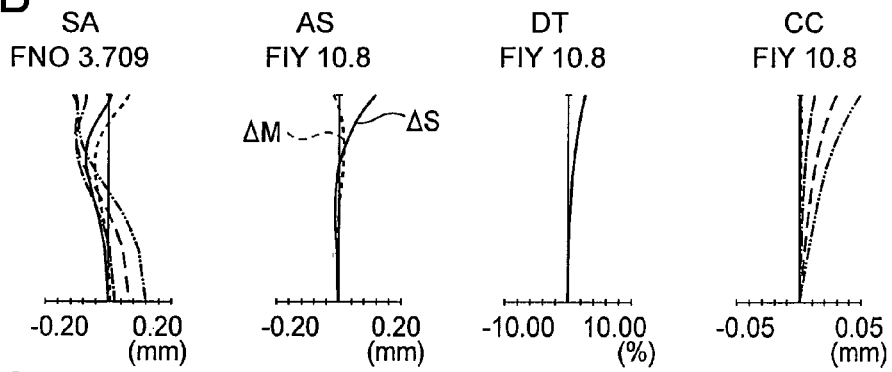
Figure 8C:
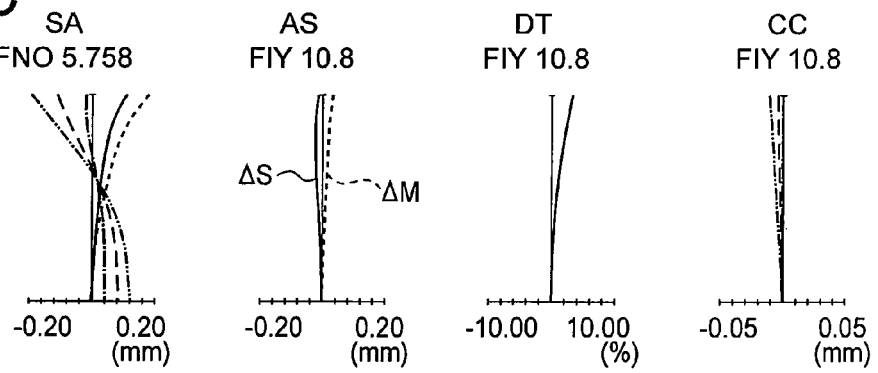

FIG. 8A, FIG. 8B, and FIG. 8C are diagrams showing a spherical aberration (SA), an astigmatism (AS), a distortion (DT), and a chromatic aberration of magnification (CC) at the time of infinite object point focusing of the zoom lens according to the third embodiment, where, FIG. 8A shows a state at the wide angle end, FIG. 8B shows an intermediate focal length state, and FIG. 8C shows a state at the telephoto end.

FIG. 9A, FIG. 9B, and FIG. 9C are diagrams showing a coma aberration (longitudinal aberration) DZY of an off-axis beam at the time of infinite object point focusing of the zoom lens according to the third embodiment, where, FIG. 9A shows a state at the wide angle end, FIG. 9B shows an intermediate focal length state, and FIG. 9C shows a state at the telephoto end.

The zoom lens according to the third embodiment, as shown in FIG. 7A, FIG. 7B, and FIG. 7C, includes in order from an object side, a first lens group G1 having a positive refractive power, a second lens group G2 having a negative refractive power, an aperture stop S, a third lens group G3 having a positive refractive power, and a fourth lens group G4 having a negative refractive power.

The first lens group G1 includes a cemented lens of a negative meniscus lens L1 having a convex surface directed toward the object side and a biconvex positive lens L2, in order from the object side, and has a positive refractive power as a whole.

The second lens group G2 includes in order from the object side, a biconcave negative lens L3, a negative meniscus lens L4 having a convex surface directed toward the object side, and a positive meniscus lens L5 having a convex surface directed toward the object side, and has a negative refractive power as a whole.

The third lens group G3 includes a positive meniscus lens L6 having a convex surface directed toward the object side, a biconvex positive lens L7, a biconcave negative lens L8, and a biconvex positive lens L9, and has a positive refractive power as a whole.

The fourth lens group G4 includes a cemented lens of a negative meniscus lens L10 having a convex surface directed toward the object side and a positive meniscus lens L11 having a convex surface directed toward the object side, and has a negative refractive power as a whole.

The negative meniscus lens L10 corresponds to the lens LB according to the present invention, and the positive meniscus lens L11 corresponds to the lens LA according to the present invention.

At the time of zooming from the wide angle end to the telephoto end, the first lens group G1 is fixed. The second lens group G2 moves toward an image side. The third lens group G3 moves toward the object side. The fourth lens group G4 moves toward the object side.

An aspheric surface is provided to five surfaces namely, a surface on the object side of the negative meniscus lens L4 in the second lens group G2, a surface on the object side of the positive meniscus lens L6 and both surfaces of the biconvex positive lens L7 on the object side in the third lens group G3, and a surface on the image side of the positive meniscus lens L11 in the fourth lens group G4.

Figure 10A:
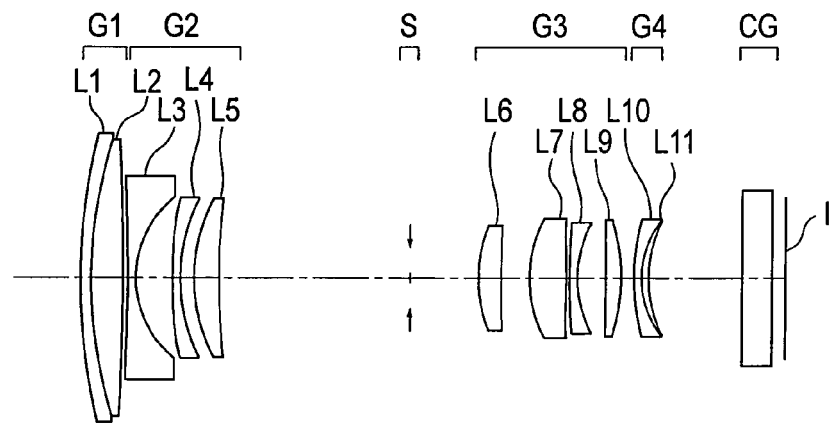
FIG. 10A, FIG. 10B, and FIG. 10C are cross-sectional views along an optical axis showing an optical arrangement at the time of infinite object point focusing of a zoom lens according to a fourth embodiment of the present invention, where.
Figure 10B:
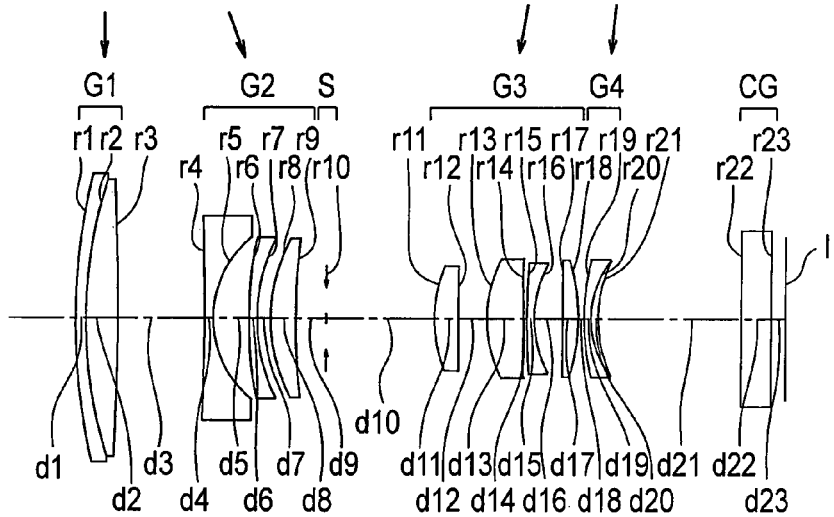
Figure 10C:
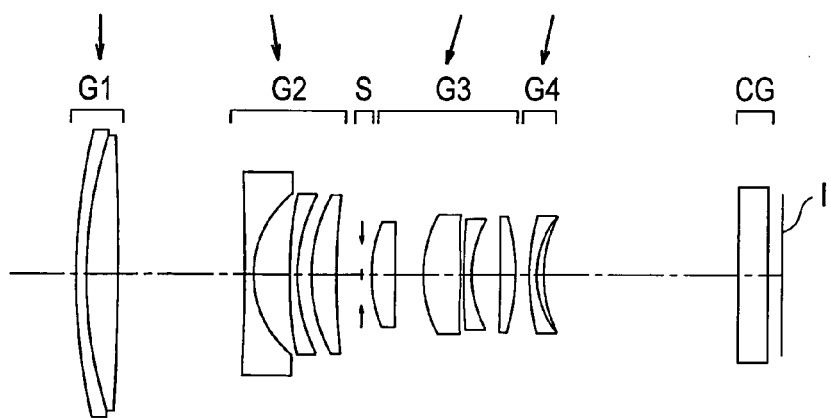

Next, a zoom lens according to a fourth embodiment of the present invention will be described below. FIG. 10A, FIG. 10B, and FIG. 10C are cross-sectional views along an optical axis showing an optical arrangement at the time of infinite object point focusing of the zoom lens according to the fourth embodiment of the present invention, where, FIG. 10A shows a state at a wide angle end, FIG. 10B shows an intermediate focal length state, and FIG. 10C shows a state at a telephoto end.

Figure 11A:
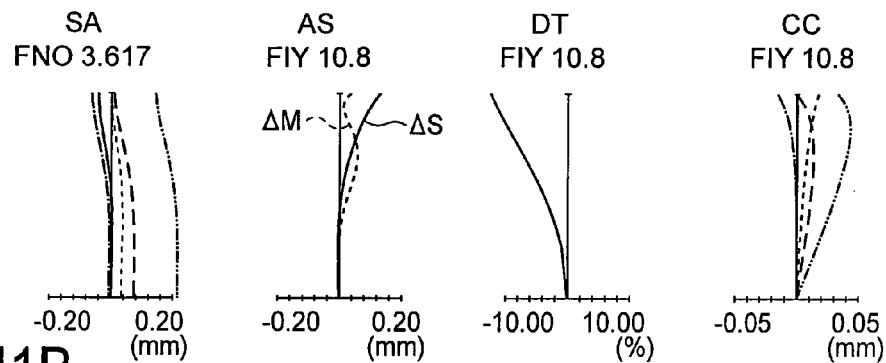
FIG. 11A, FIG. 11B, and FIG. 11C are diagrams showing a spherical aberration, an astigmatism, a distortion, and a chromatic aberration of magnification at the time of infinite object point focusing of the zoom lens according to the fourth embodiment, where.
Figure 11B:
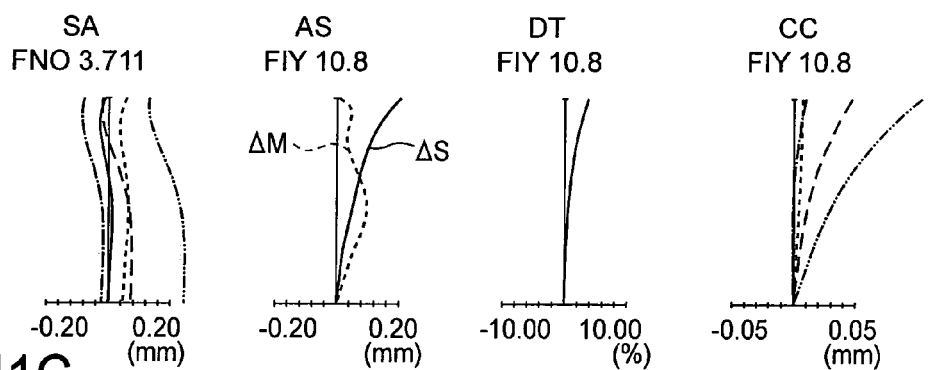
Figure 11C:
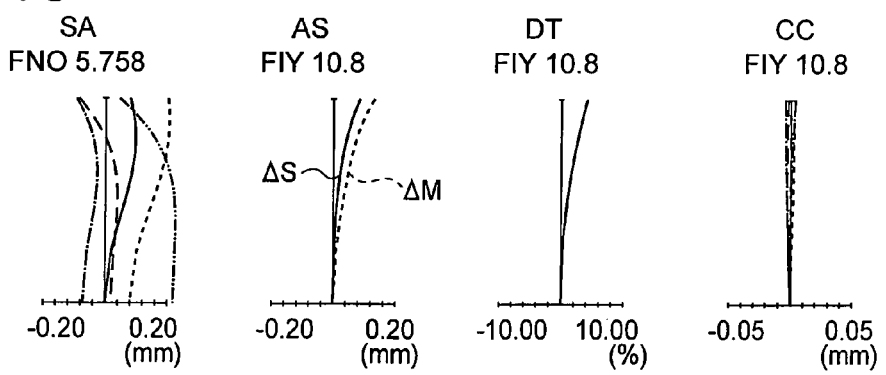

FIG. 11A, FIG. 11B, and FIG. 11C are diagrams showing a spherical aberration (SA), an astigmatism (AS), a distortion (DT), and a chromatic aberration of magnification (CC) at the time of infinite object point focusing of the zoom lens according to the fourth embodiment, where, FIG. 11A shows a state at the wide angle end, FIG. 11B shows an intermediate focal length state, and FIG. 11C shows a state at the telephoto end.

FIG. 12A, FIG. 12B, and FIG. 12C are diagrams showing a coma aberration (longitudinal aberration) DZY of an off-axis beam at the time of infinite object point focusing of the zoom lens according to the fourth embodiment, where, FIG. 12A shows a state at the wide angle end, FIG. 12B shows an intermediate focal length state, and FIG. 12C shows a state at the telephoto end.

The zoom lens according to the fourth embodiment, as shown in FIG. 10A, FIG. 10B, and FIG. 10C, includes in order from an object side, a first lens group G1 having a positive refractive power, a second lens group G2 having a negative refractive power, an aperture stop S, a third lens group G3 having a positive refractive power, and a fourth lens group G4 having a negative refractive power.

The first lens group G1 includes a cemented lens of a negative meniscus lens L1 having a convex surface directed toward the object side and a biconvex positive lens L2, in order from the object side, and has a positive refractive power as a whole.

The second lens group G2 includes in order from the object side, a biconcave negative lens L3, a negative meniscus lens L4 having a convex surface directed toward the object side, and a positive meniscus lens L5 having a convex surface directed toward the object side, and has a negative refractive power as a whole.

The third lens group G3 includes a positive meniscus lens L6 having a convex surface directed toward the object side, a biconvex positive lens L7, a negative meniscus lens L8 having a convex surface directed toward the object side, and a positive meniscus lens L9 having a convex surface directed toward an image side, and has a positive refractive power as a whole.

The fourth lens group G4 includes a cemented lens of a negative meniscus lens L10 having a convex surface directed toward the object side and a positive meniscus lens L11 having a convex surface directed toward the object side, and has a negative refractive power as a whole.

The negative meniscus lens L10 corresponds to the lens LB according to the present invention, and the positive meniscus lens L11 corresponds to the lens LA according to the present invention.

At the time of zooming from the wide angle end to the telephoto end, the first lens group G1 is fixed. The second lens group G2 moves toward the image side. The third lens group G3 moves toward the object side. The fourth lens group G4 moves toward the object side.

An aspheric surface is provided to five surfaces namely, a surface on the object side of the negative meniscus lens L4 in the second lens group G2, a surface on the object side of the positive meniscus lens L6, and both surfaces of the biconvex positive lens L7 in the third lens group G3, and a surface on the image side of the positive meniscus lens L11 in the fourth lens group G4.

Numerical data of each embodiment described above is shown below. Each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. $F_{NO}$ denotes an F number, f denotes a focal length of the entire zoom lens system, Further, * denotes an aspheric data, S denotes a stop.

When z is let to be an optical axis with a direction of traveling of light as a positive (direction), and y is let to be in a direction orthogonal to the optical axis, a shape of the aspheric surface is described by the following expression.

$$z = (y^2/r)/[1+\{1-(K+1)(y/r)^2\}^{1/2}] + A_4 y^4 + A_6 y^6 + A_8 y^8 + A_{10} y^{10} + A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Example 1

| Unit mm | | | | | |
|---|---|---|---|---|---|
| Surface data | | | | | |
| Surface no. | r | d | nd | vd | effective radius |
| Object plane | ∞ | ∞ | | | |
| 1 | 55.9710 | 1.5000 | 1.92286 | 18.90 | 20.000 |
| 2 | 49.4676 | 3.7352 | 1.80400 | 46.57 | 16.883 |
| 3 | 143.9824 | Variable | | | 15.869 |
| 4 | 90.1274 | 1.5053 | 1.84666 | 23.78 | 14.000 |
| 5 | 13.8963 | 7.4674 | | | 10.710 |
| 6* | −40.0282 | 1.1523 | 1.69350 | 53.20 | 10.478 |
| 7 | 26.4226 | 0.4177 | | | 10.428 |
| 8 | 24.4014 | 4.8612 | 1.84666 | 23.78 | 10.688 |
| 9 | −79.3088 | Variable | | | 10.591 |
| 10(stop) | ∞ | Variable | | | 4.670 |
| 11* | 18.0936 | 2.7323 | 1.82080 | 42.71 | 7.000 |
| 12* | 165.5978 | 4.2202 | | | 7.022 |
| 13 | 22.9053 | 1.3929 | 1.84666 | 23.78 | 7.204 |
| 14 | 10.6875 | 4.1457 | 1.49700 | 81.54 | 6.847 |
| 15* | −83.1506 | 0.1000 | | | 6.886 |
| 16 | 92.4799 | 0.5700 | 1.80000 | 29.84 | 6.910 |
| 17 | 20.7081 | 2.1302 | | | 6.904 |
| 18 | 39.8829 | 3.9655 | 1.78590 | 44.20 | 7.402 |
| 19 | −62.6006 | Variable | | | 7.614 |
| 20 | 97.2996 | 1.0000 | 1.83481 | 42.71 | 7.692 |
| 21 | 21.3586 | 1.0000 | 1.63547 | 22.84 | 7.661 |
| 22 | 31.8237 | Variable | | | 7.676 |
| 23 | ∞ | 4.2000 | 1.51633 | 64.14 | 12.000 *filter |
| 24 | ∞ | 1.9766 | | | 12.000 |
| Image plane(Light receiving surface) | ∞ | | | | |

Aspherical surface data

6th surface

K = 1.0000
A2 = 0.0000E+00, A4 = 2.7466E−06, A6 = 3.4652E−09, A8 = −1.1234E−10,
A10 = 0.0000E+00

11th surface

K = 0.
A2 = 0.0000E+00, A4 = −2.0116E−05, A6 = −1.6004E−07, A8 = 0.0000E+00,
A10 = 0.0000E+00

12th surface

K = 0.
A2 = 0.0000E+00, A4 = −1.3060E−05, A6 = −1.8591E−07, A8 = 4.2386E−10,
A10 = 0.0000E+00

15th surface

K = 0.
A2 = 0.0000E+00, A4 = 7.3875E−05, A6 = 2.5574E−07, A8 = −1.2551E−09,
A10 = 0.0000E+00

Various data

| | Wide angle | Intermediate | Telephoto |
|---|---|---|---|
| Focal length | 14.28058 | 24.22973 | 40.65127 |
| Fno. | 3.4824 | 3.8174 | 5.7579 |
| Angle of field 2ω | 81.7° | 48.4° | 29.4° |
| Image height | 10.8 | 10.8 | 10.8 |
| Lens total length | 99.2172 | 99.2111 | 99.2092 |
| d3 | 0.99972 | 12.80797 | 16.15066 |

-continued

| Unit mm | | | |
|---|---|---|---|
| d9 | 25.10689 | 6.78556 | 3.41673 |
| d10 | 10.33688 | 11.54172 | 1.50036 |
| d19 | 1.19364 | 1.18790 | 1.18619 |
| d22 | 13.50750 | 18.80782 | 28.88126 |

| Lens | Initial surface | Focal length |
|---|---|---|
| 1 | 1 | 114.05985 |
| 2 | 4 | −22.84630 |
| 3 | 11 | 21.20477 |
| 4 | 20 | −48.55991 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L12 | 1.635473 | 1.627801 | 1.655618 | 1.673790 | 1.690480 |
| L4 | 1.693500 | 1.689550 | 1.702580 | 1.709705 | 1.715640 |
| L6 | 1.820800 | 1.815070 | 1.834290 | 1.845133 | 1.854335 |
| L13 | 1.516330 | 1.513855 | 1.521905 | 1.526213 | 1.529768 |
| L8 | 1.496999 | 1.495136 | 1.501231 | 1.504506 | 1.507205 |
| L10 | 1.785896 | 1.780584 | 1.798364 | 1.808375 | 1.816868 |
| L11 | 1.834807 | 1.828975 | 1.848520 | 1.859547 | 1.868911 |
| L2 | 1.804000 | 1.798815 | 1.816080 | 1.825698 | 1.833800 |
| L9 | 1.800000 | 1.792237 | 1.819043 | 1.835170 | 1.849510 |
| L1 | 1.922860 | 1.909158 | 1.957996 | 1.989713 | 2.019763 |
| L3, L5, L7 | 1.846660 | 1.836488 | 1.872096 | 1.894186 | 1.914294 |

Example 2

| Unit mm | | | | |
|---|---|---|---|---|
| Surface data | | | | |
| Surface no. | r | d | nd | vd | effective radius |
|---|---|---|---|---|---|
| Object plane | ∞ | ∞ | | | |
| 1 | 89.3405 | 1.5000 | 1.94595 | 17.98 | 20.000 |
| 2 | 70.7392 | 4.5000 | 1.69680 | 55.53 | 17.371 |
| 3 | −941.2812 | Variable | | | 16.110 |
| 4 | 2092.0128 | 1.2000 | 1.83481 | 42.71 | 14.000 |
| 5 | 15.9497 | 6.3742 | | | 11.139 |
| 6* | −304.5423 | 1.1000 | 1.69350 | 53.20 | 10.840 |
| 7 | 37.4086 | 0.8222 | | | 10.639 |
| 8 | 26.1684 | 3.5000 | 1.84666 | 23.78 | 10.779 |
| 9 | 151.1493 | Variable | | | 10.536 |
| 10(stop) | ∞ | Variable | | | 4.531 |
| 11* | 21.4719 | 3.0000 | 1.76802 | 49.24 | 6.700 |
| 12 | −86.6030 | 1.0000 | 1.84666 | 23.78 | 6.796 |
| 13 | 126.7776 | 5.8273 | | | 6.881 |
| 14* | 17.9813 | 5.0000 | 1.49700 | 81.54 | 8.023 |
| 15* | −19.2416 | 0.2000 | | | 7.974 |
| 16 | −156.6800 | 1.0000 | 1.80000 | 29.84 | 7.650 |
| 17 | 16.7907 | 2.3000 | | | 7.368 |
| 18 | 31.1241 | 2.0000 | 1.80610 | 40.92 | 7.731 |
| 19 | 910.8764 | Variable | | | 7.737 |
| 20 | 63.7665 | 1.0000 | 1.80610 | 40.92 | 7.771 |
| 21 | 16.1697 | 1.0000 | 1.67412 | 20.10 | 7.661 |
| 22* | 25.6730 | Variable | | | 7.659 |
| 23 | ∞ | 4.2000 | 1.51633 | 64.14 | 12.000 *filter |
| 24 | ∞ | 1.9845 | | | 12.000 |
| Image plane(Light receiving surface) | ∞ | | | | |

-continued

| Unit mm |
| --- |

| Aspherical surface data |
| --- |

6th surface

K = 0.
A2 = 0.0000E+00, A4 = −2.5976E−07, A6 = −1.7971E−08, A8 = 8.0384E−11,
A10 = 0.0000E+00

11th surface

K = 0.
A2 = 0.0000E+00, A4 = −5.9689E−06, A6 = −4.7338E−08, A8 = −1.5467E−10,
A10 = 1.1302E−12

14th surface

K = 0.
A2 = 0.0000E+00, A4 = −4.8253E−05, A6 = −5.6030E−08, A8 = −4.4899E−10,
A10 = 0.0000E+00

15th surface

K = 0.
A2 = 0.0000E+00, A4 = 8.5204E−05, A6 = −3.5979E−07, A8 = 8.8359E−10,
A10 = 0.0000E+00

22nd surface

K = 0.
A2 = 0.0000E+00, A4 = −2.1364E−06, A6 = 1.0987E−07, A8 = 4.0071E−10,
A10 = 0.0000E+00

| Various data | | | |
| --- | --- | --- | --- |
| | Wide angle | Intermediate | Telephoto |
| Focal length | 14.27926 | 24.22818 | 40.64942 |
| Fno. | 3.5210 | 3.6928 | 5.7579 |
| Angle of field 2ω | 84.1 | 47.8 | 29.1 |
| Image height | 10.8 | 10.8 | 10.8 |
| Lens total length | 99.0949 | 99.1710 | 99.0925 |
| d3 | 1.05836 | 12.42282 | 16.86721 |
| d9 | 26.03096 | 4.86906 | 3.51074 |
| d10 | 9.89578 | 13.84712 | 1.52108 |
| d19 | 1.41294 | 1.11656 | 2.23423 |
| d22 | 13.18859 | 19.38467 | 27.44140 |

| Lens | Initial surface | Focal length |
| --- | --- | --- |
| 1 | 1 | 127.95824 |
| 2 | 4 | −23.62532 |
| 3 | 11 | 21.02515 |
| 4 | 20 | −46.58408 |

| Table of index of glass material | List of index per wavelength of medium used in the present embodiment | | | | |
| --- | --- | --- | --- | --- | --- |
| GLA | 587.56 | 656.27 | 486.13 | 435.84 | 404.66 |
| L12 | 1.674117 | 1.665099 | 1.698643 | 1.721956 | 1.745200 |
| L1 | 1.945950 | 1.931230 | 1.983830 | 2.018254 | 2.051063 |
| L4 | 1.693500 | 1.689550 | 1.702580 | 1.709705 | 1.715640 |
| L6 | 1.768020 | 1.763310 | 1.778910 | 1.787509 | 1.794710 |
| L13 | 1.516330 | 1.513855 | 1.521905 | 1.526213 | 1.529768 |
| L8 | 1.496999 | 1.495136 | 1.501231 | 1.504506 | 1.507205 |
| L10, L11 | 1.806098 | 1.800248 | 1.819945 | 1.831173 | 1.840781 |
| L3 | 1.834807 | 1.828975 | 1.848520 | 1.859547 | 1.868911 |
| L2 | 1.696797 | 1.692974 | 1.705522 | 1.712339 | 1.718005 |
| L9 | 1.800000 | 1.792237 | 1.819043 | 1.835170 | 1.849510 |
| L5, L7 | 1.846660 | 1.836488 | 1.872096 | 1.894186 | 1.914294 |

Example 3

| | | Unit mm | | | |
|---|---|---|---|---|---|
| | | Surface data | | | |
| Surface no. | r | d | nd | vd | effective radius |
| Object plane | ∞ | ∞ | | | |
| 1 | 83.1725 | 1.5000 | 1.94595 | 17.98 | 20.000 |
| 2 | 64.2611 | 4.5000 | 1.69680 | 55.53 | 16.207 |
| 3 | −3.540E+04 | Variable | | | 14.885 |
| 4 | −1705.6554 | 1.2000 | 1.79952 | 42.22 | 14.000 |
| 5 | 14.8599 | 5.3066 | | | 11.070 |
| 6* | 46.5893 | 1.1000 | 1.69350 | 53.20 | 10.992 |
| 7 | 21.5202 | 2.2170 | | | 10.591 |
| 8 | 24.7470 | 3.5000 | 1.84666 | 23.78 | 10.732 |
| 9 | 92.1471 | Variable | | | 10.442 |
| 10(stop) | ∞ | Variable | | | 4.623 |
| 11* | 17.8917 | 2.4000 | 1.76802 | 49.24 | 7.100 |
| 12 | 29.4476 | 4.1144 | | | 7.078 |
| 13* | 10.4931 | 6.0000 | 1.49700 | 81.54 | 8.188 |
| 14* | −16.5180 | 0.0826 | | | 7.966 |
| 15 | −52.0740 | 1.0000 | 1.80000 | 29.84 | 7.564 |
| 16 | 13.8317 | 3.5271 | | | 7.077 |
| 17 | 83.9594 | 2.2000 | 1.77250 | 49.60 | 7.541 |
| 18 | −45.3905 | Variable | | | 7.653 |
| 19 | 42.5129 | 1.0000 | 1.77250 | 49.60 | 7.756(LB) |
| 20 | 14.4299 | 1.0000 | 1.63387 | 23.38 | 7.603(LA) |
| 21* | 21.7322 | Variable | | | 7.599 |
| 22 | ∞ | 4.2000 | 1.51633 | 64.14 | 12.000 *filter |
| 23 | ∞ | 1.9140 | | | 12.000 |
| Image plane(Light receiving surface) | ∞ | | | | |

Aspherical surface data

6th surface

K = 0.
A2 = 0.0000E+00, A4 = 1.9265E−05, A6 = −6.2937E−09, A8 = 4.6374E−10,
A10 = 0.0000E+00

11th surface

K = 0.
A2 = 0.0000E+00, A4 = 3.2099E−05, A6 = −1.3503E−07, A8 = −3.0828E−09,
A10 = 3.2740E−11

13th surface

K = 0.
A2 = 0.0000E+00, A4 = −1.4389E−04, A6 = −3.7673E−07, A8 = −1.0129E−09,
A10 = 0.0000E+00

14th surface

K = 0.
A2 = 0.0000E+00, A4 = 1.7473E−04, A6 = −1.1789E−06, A8 = 1.0866E−08,
A10 = 0.0000E+00

21st surface

K = 0.
A2 = 0.0000E+00, A4 = 1.1147E−07, A6 = 1.2507E−07, A8 = −6.9935E−10,
A10 = 0.0000E+00

Various data

| | Wide angle | Intermediate | Telephoto |
|---|---|---|---|
| Focal length | 14.28613 | 24.22181 | 40.64610 |
| Fno. | 3.4631 | 3.7093 | 5.7579 |
| Angle of field 2ω | 80.2 | 47.1 | 28.9 |
| Image height | 10.8 | 10.8 | 10.8 |
| Lens total length | 98.8873 | 99.3953 | 99.0035 |
| d3 | 0.68512 | 12.40038 | 17.47148 |
| d9 | 25.88780 | 4.96713 | 3.51471 |
| d10 | 10.85526 | 14.37143 | 1.41718 |

-continued

| | Unit mm | | |
|---|---|---|---|
| d18 | 1.77452 | 0.88219 | 2.12217 |
| d21 | 12.92301 | 20.02770 | 27.66855 |

| Lens | Initial surface | Focal length |
|---|---|---|
| 1 | 1 | 132.46329 |
| 2 | 4 | −24.55536 |
| 3 | 11 | 21.63266 |
| 4 | 19 | −49.87196 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L1 | 1.945950 | 1.931230 | 1.983830 | 2.018254 | 2.051063 |
| L4 | 1.693500 | 1.689550 | 1.702580 | 1.709705 | 1.715640 |
| L6 | 1.768020 | 1.763310 | 1.778910 | 1.787509 | 1.794710 |
| L11 | 1.633870 | 1.626381 | 1.653490 | 1.671610 | 1.688826 |
| L12 | 1.516330 | 1.513855 | 1.521905 | 1.526213 | 1.529768 |
| L7 | 1.496999 | 1.495136 | 1.501231 | 1.504506 | 1.507205 |
| L3 | 1.799516 | 1.793879 | 1.812814 | 1.823553 | 1.832706 |
| L9, L10 | 1.772499 | 1.767798 | 1.783374 | 1.791971 | 1.799174 |
| L2 | 1.696797 | 1.692974 | 1.705522 | 1.712339 | 1.718005 |
| L8 | 1.800000 | 1.792237 | 1.819043 | 1.835170 | 1.849510 |
| L5 | 1.846660 | 1.836488 | 1.872096 | 1.894186 | 1.914294 |

Example 4

| | Unit mm | | | |
|---|---|---|---|---|
| | Surface data | | | | |

| Surface no. | r | d | nd | νd | effective radius |
|---|---|---|---|---|---|
| Object plane | ∞ | ∞ | | | |
| 1 | 87.9659 | 1.5000 | 1.94595 | 17.98 | 20.000 |
| 2 | 66.4601 | 4.5000 | 1.69680 | 55.53 | 16.200 |
| 3 | −428.6745 | Variable | | | 14.981 |
| 4 | −364.1506 | 1.2000 | 1.78590 | 44.20 | 14.000 |
| 5 | 14.9636 | 5.0888 | | | 11.012 |
| 6* | 78.2509 | 1.1000 | 1.69350 | 53.20 | 10.938 |
| 7 | 25.3889 | 1.9268 | | | 10.607 |
| 8 | 24.5062 | 3.5000 | 1.84666 | 23.78 | 10.787 |
| 9 | 98.7596 | Variable | | | 10.514 |
| 10(stop) | ∞ | Variable | | | 4.420 |
| 11* | 19.8482 | 3.2676 | 1.49700 | 81.54 | 6.700 |
| 12 | 259.8129 | 3.9935 | | | 6.942 |
| 13* | 18.9961 | 5.1811 | 1.76802 | 49.24 | 7.977 |
| 14* | −78.3736 | 0.4461 | | | 7.559 |
| 15 | 99.0960 | 1.0701 | 1.92286 | 20.88 | 7.423 |
| 16 | 16.4313 | 3.9836 | | | 7.127 |
| 17 | −1887.2477 | 2.2000 | 1.71999 | 50.23 | 7.644 |
| 18 | −29.1973 | Variable | | | 7.792 |
| 19 | 33.6509 | 1.0000 | 1.77250 | 49.60 | 7.881 |
| 20 | 13.4328 | 1.0000 | 1.63296 | 24.01 | 7.656 |
| 21* | 18.8235 | Variable | | | 7.646 |
| 22 | ∞ | 4.2000 | 1.51633 | 64.14 | 12.000 *filter |
| 23 | ∞ | 1.9417 | | | 12.000 |
| Image plane(Light receiving surface) | ∞ | | | | |

Aspherical surface data

6th surface

K = 0.
A2 = 0.0000E+00, A4 = 1.2138E−05, A6 = −2.0543E−08, A8 = 4.2477E−10,
A10 = 0.0000E+00

-continued

Unit mm

11th surface

K = 0.
A2 = 0.0000E+00, A4 = −5.6167E−06, A6 = 2.7152E−07, A8 = −6.8425E−09,
A10 = 4.1818E−11

13th surface

K = 0.
A2 = 0.0000E+00, A4 = −9.4955E−09, A6 = −1.9916E−07, A8 = 5.9709E−09,
A10 = 0.0000E+00

14th surface

K = 0.
A2 = 0.0000E+00, A4 = 7.6263E−05, A6 = −4.0382E−07, A8 = 9.1001E−09,
A10 = 0.0000E+00

21st surface

K = 0.
A2 = 0.0000E+00, A4 = 1.5568E−06, A6 = −2.3766E−08, A8 = 4.9965E−10,
A10 = 0.0000E+00

Various data

|  | Wide angle | Intermediate | Telephoto |
|---|---|---|---|
| Focal length | 14.27990 | 24.23676 | 40.64780 |
| Fno. | 3.6168 | 3.7115 | 5.7579 |
| Angle of field 2ω | 81.3 | 46.6 | 28.7 |
| Image height | 10.8 | 10.8 | 10.8 |
| Lens total length | 98.8106 | 99.5647 | 99.0221 |
| d3 | 0.62682 | 12.15692 | 17.77090 |
| d9 | 26.61258 | 4.23361 | 3.50320 |
| d10 | 9.53901 | 15.13554 | 1.38514 |
| d18 | 1.87659 | 0.78920 | 1.96342 |
| d21 | 13.05636 | 20.08762 | 27.28711 |

| Lens | Initial surface | Focal length |
|---|---|---|
| 1 | 1 | 116.04389 |
| 2 | 4 | −24.00002 |
| 3 | 11 | 21.61328 |
| 4 | 19 | −49.44081 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L11 | 1.632960 | 1.625570 | 1.651930 | 1.668330 | 1.683330 |
| L8 | 1.922860 | 1.910380 | 1.954570 | 1.982810 | 2.009196 |
| L1 | 1.945950 | 1.931230 | 1.983830 | 2.018254 | 2.051063 |
| L4 | 1.693500 | 1.689550 | 1.702580 | 1.709705 | 1.715640 |
| L7 | 1.768020 | 1.763310 | 1.778910 | 1.787509 | 1.794710 |
| L12 | 1.516330 | 1.513855 | 1.521905 | 1.526213 | 1.529768 |
| L6 | 1.496999 | 1.495136 | 1.501231 | 1.504506 | 1.507205 |
| L3 | 1.785896 | 1.780584 | 1.798364 | 1.808375 | 1.816868 |
| L10 | 1.772499 | 1.767798 | 1.783374 | 1.791971 | 1.799174 |
| L9 | 1.719995 | 1.715670 | 1.730004 | 1.737917 | 1.744546 |
| L2 | 1.696797 | 1.692974 | 1.705522 | 1.712339 | 1.718005 |
| L5 | 1.846660 | 1.836488 | 1.872096 | 1.894186 | 1.914294 |

Values of conditional expressions of each embodiment are shown below:

|  | Example 1 | Example 2 | Example 3 | Example 4 |
|---|---|---|---|---|
| fw (Wide angle) | 14.281 | 14.279 | 14.286 | 14.280 |
| fs (Intermediate) | 24.230 | 24.228 | 24.222 | 24.237 |
| ft (Telephoto) | 40.651 | 40.649 | 40.646 | 40.648 |
| Half angle of field ωw (Wide angle end) | 40.9 | 42.1 | 40.1 | 41.7 |
| Half angle of field ωs (Intermediate) | 24.2 | 23.9 | 23.6 | 23.3 |
| Half angle of field ωt (Telephoto end) | 14.7 | 14.6 | 14.5 | 14.4 |
| y10 | 10.8 | 10.8 | 10.8 | 10.8 |
| (R4F + R4R)/(R4F − R4R) | 1.972 | 2.348 | 3.092 | 3.539 |
| (R4LAF + R4LAR)/(R4LAF − R4LAR) | −5.082 | −4.403 | −4.952 | −5.984 |
| (R3ALF + R3ALR)/(R3ALF − R3ALR) | −3.160 | −3.343 | −1.394 | −0.983 |
| nd | 1.63547 | 1.67412 | 1.63387 | 1.63296 |
| b | 2.2453 | 2.2108 | 2.2581 | 2.2740 |

-continued

|  | Example 1 | Example 2 | Example 3 | Example 4 |
|---|---|---|---|---|
| θgF [= θgF (LA)] | 0.6533 | 0.6950 | 0.6684 | 0.6222 |
| β | 0.7826 | 0.8088 | 0.8007 | 0.7581 |
| νd [= νd (LA)] | 22.84 | 20.10 | 23.38 | 24.01 |
| θhg [= θhg (LA)] | 0.6218 | 0.6927 | 0.6476 | 0.5690 |
| βhg | 0.8123 | 0.8603 | 0.8425 | 0.7692 |
| θgF [= θgF (LB)] | 0.5645 | 0.5703 | 0.5523 | 0.5523 |
| νd [= νd (LB)] | 42.71 | 40.92 | 49.60 | 49.60 |
| θhg [= θhg (LB)] | 0.4790 | 0.4881 | 0.4624 | 0.4624 |
| θgF (LA) − θgF (LB) | 0.0888 | 0.1247 | 0.1161 | 0.0699 |
| θhg (LA) − θhg (LB) | 0.1428 | 0.2046 | 0.1852 | 0.1066 |
| νd (LA) − νd (LB) | −19.87 | −20.82 | 26.22 | −25.59 |
| y07 | 7.56 | 7.56 | 7.56 | 7.56 |
| tanω07w | 0.56726 | 0.57875 | 0.56124 | 0.56728 |
| y07/(fw * tanω07w) | 0.933 | 0.915 | 0.943 | 0.933 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 13:
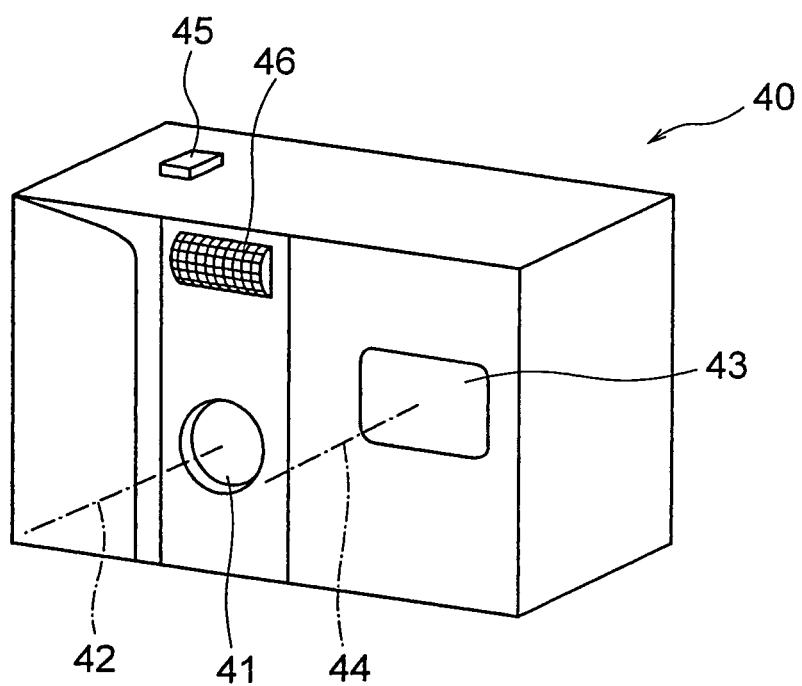
FIG. 13 is a front perspective view showing an appearance of a digital camera 40 in which, a zooming optical system according to the present invention is incorporated.
Figure 14:
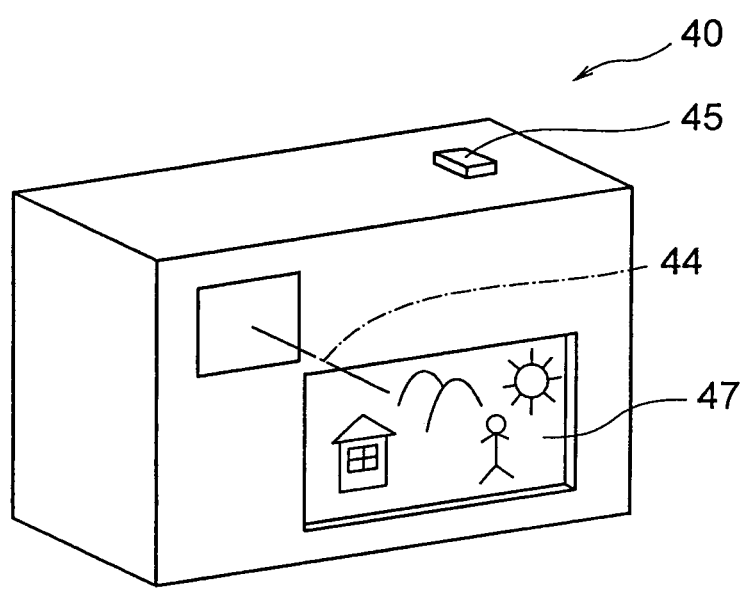
FIG. 14 is a rear perspective view of the digital camera 40.
Figure 15:
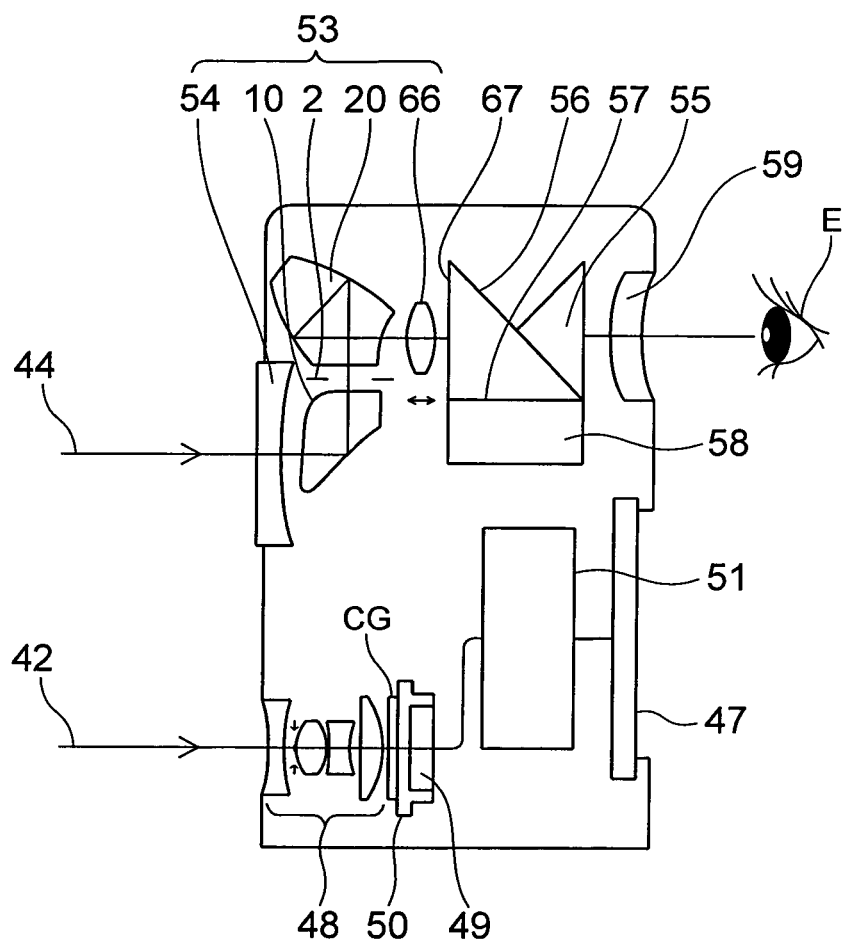
FIG. 15 is a cross-sectional view showing an optical arrangement of the digital camera 40.

In FIG. 13 to FIG. 15 show conceptual diagrams of structures in which the image forming optical system according to the present invention is incorporated in a photographic optical system 41 of a digital camera. FIG. 13 is a frontward perspective view showing an appearance of a digital camera 40, FIG. 14 is a rearward perspective view of the same, and FIG. 15 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Further, the present invention could be applied to the above-mentioned collapsible type digital camera as well as a bending type (an optical path reflecting type) digital camera having a bending optical system (optical path reflecting lens).

Figure 16:
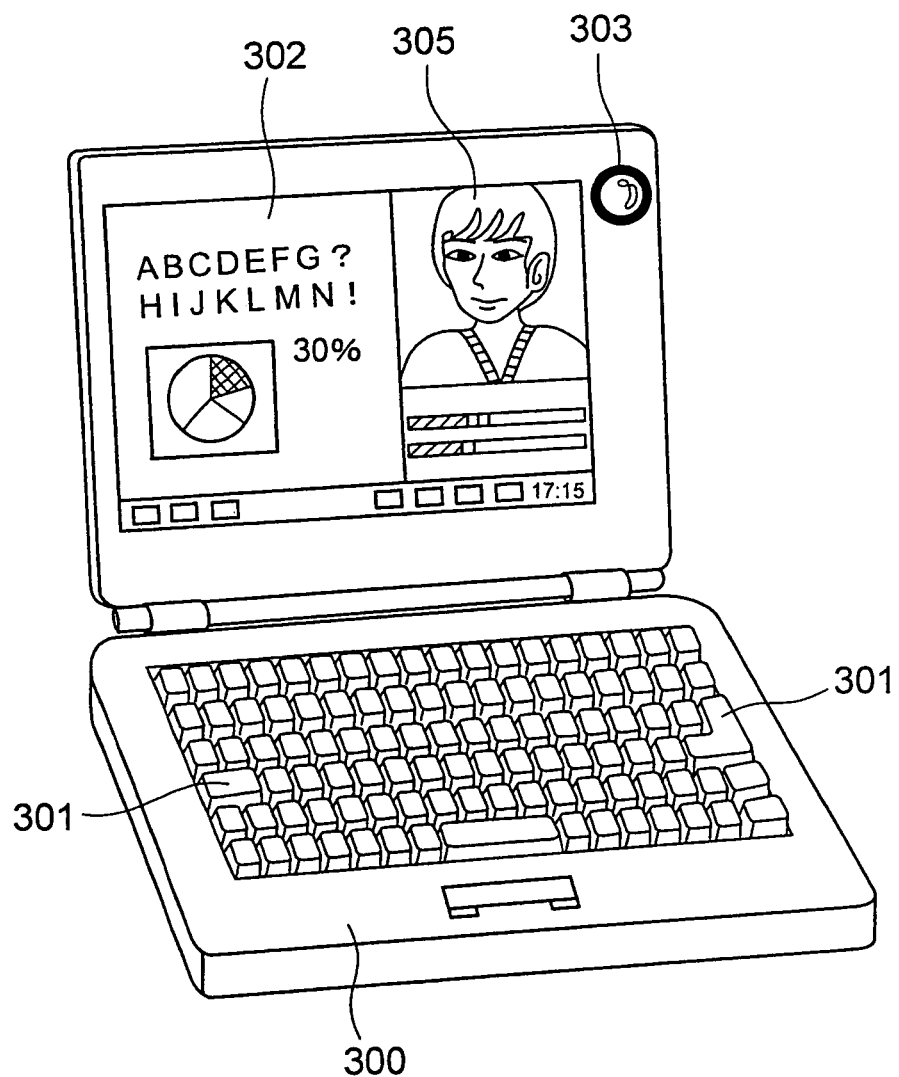
FIG. 16 is a front perspective view of a state in which, a cover of a personal computer 300 which is an example of an information processing apparatus in which, the zooming optical system of the present invention is built-in as an objective optical system, is opened.
Figure 17:
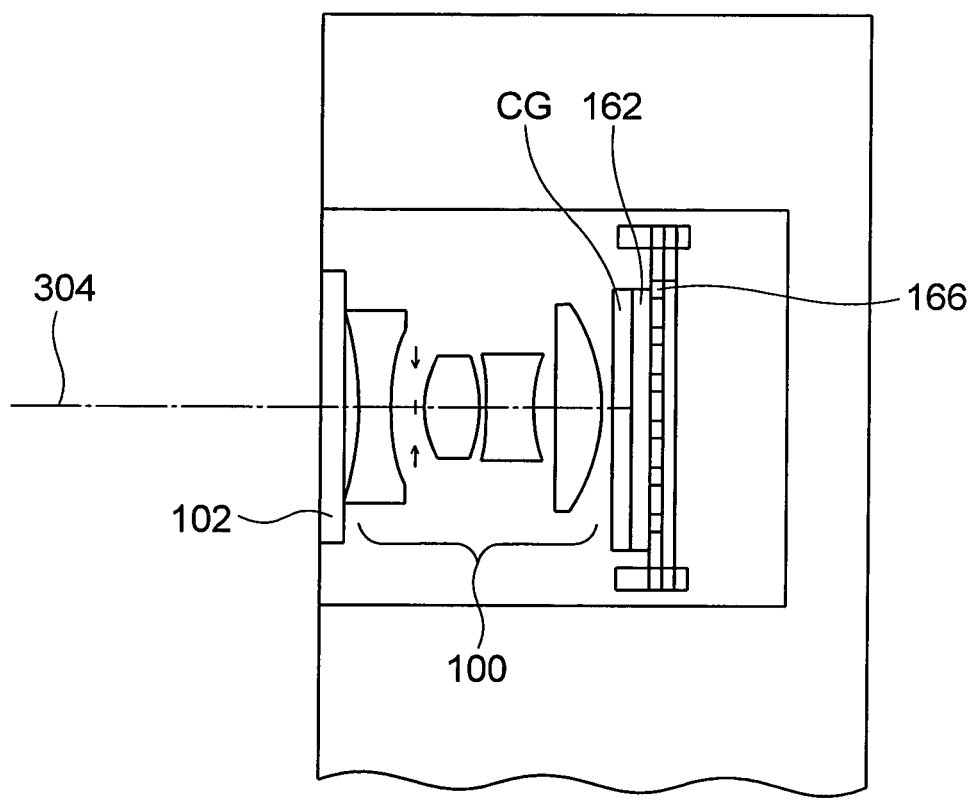
FIG. 17 is a cross-sectional view of a photographic optical system 303 of the personal computer 300.
Figure 18:
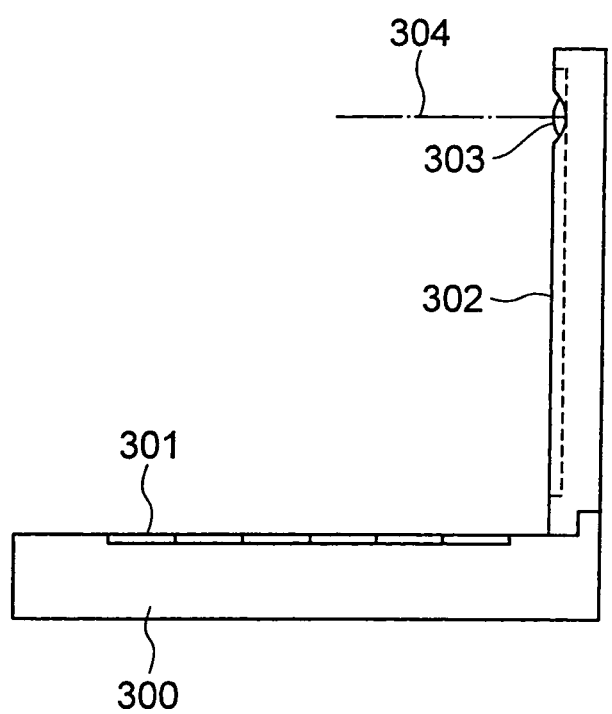
FIG. 18 is a side view of the personal computer 300.

Next, a personal computer which is an example of an information processing apparatus with a built-in image forming system as an objective optical system is shown in FIG. 16 to FIG. 18. FIG. 16 is a frontward perspective view of a personal computer 300 with its cover opened, FIG. 17 is a cross-sectional view of a photographic optical system 303 of the personal computer 300, and FIG. 18 is a side view of FIG. 16. As it is shown in FIG. 16 to FIG. 18, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 16, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 19A:
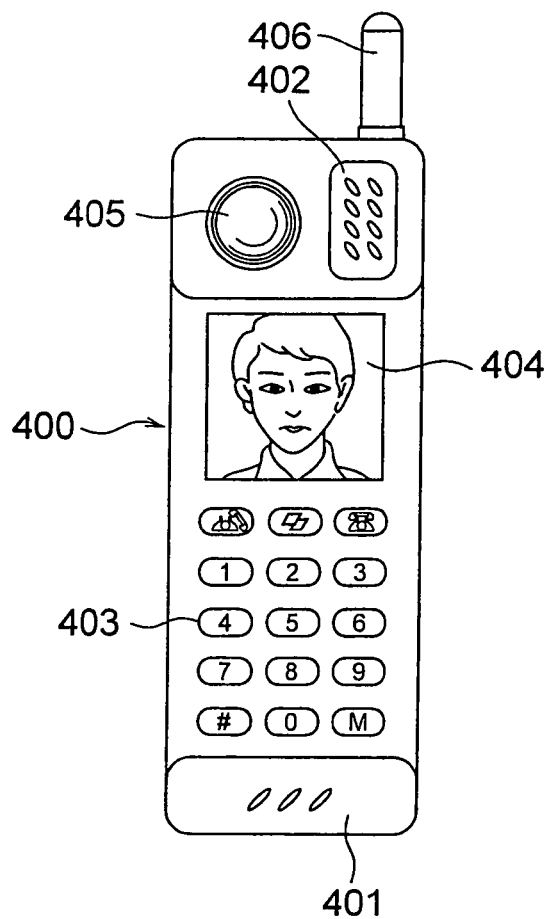
FIG. 19A, FIG. 19B, and FIG. 19C are diagrams showing a mobile telephone which is an example of the information processing apparatus in which, the zooming optical system of the present invention is built-in as a photographic optical system, where.
Figure 19B:
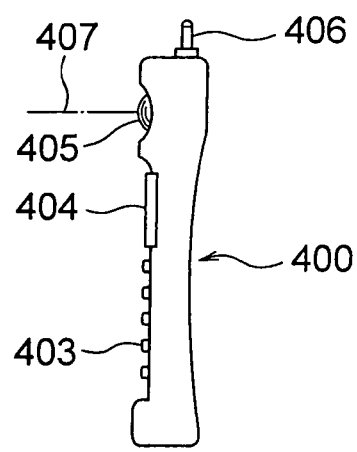
Figure 19C:
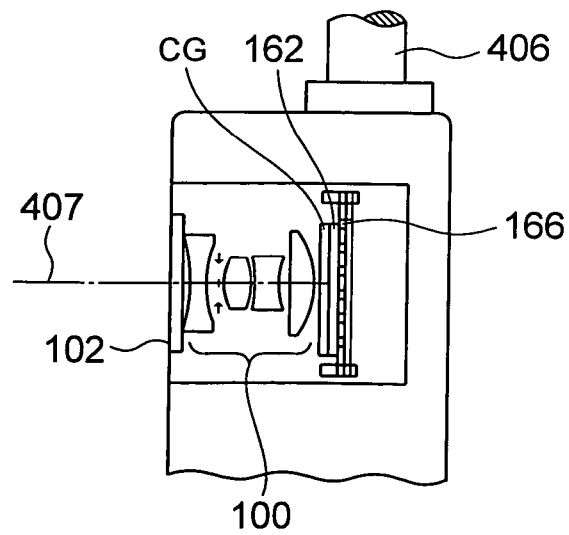

Next, a telephone which is an example of an information processing apparatus in which the image forming optical system of the present invention is built-in as a photographic optical system, particularly a portable telephone which is easy to carry is shown in FIG. 19A, FIG. 19B, and FIG. 19C. FIG. 19A is a front view of a portable telephone 400, FIG. 19B is a side view of the portable telephone 400, and FIG. 19C is a cross-sectional view of a photographic optical system 405. As shown in FIG. 19A to FIG. 19C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

As it has been described above, the present invention is useful for an image forming optical system in which, the focusing lens group is made light-weight with an improved performance of a video function of an interchangeable lens still camera, and at the same time, the chromatic aberration, the coma aberration, and the meridional curvature of field are corrected favorably. Moreover, the present invention is useful for an electronic image pickup apparatus in which, it is possible to have a high-speed focusing, a reduction of consumption of electric power, and sharpening of image by using the abovementioned image forming optical system.

According to the present invention, it is possible to make the focusing lens group light-weight with an improved performance of the video function of the interchangeable lens still camera. Furthermore, it is possible to achieve an image forming optical system in which, the chromatic aberration, the coma aberration, and the meridional curvature of field are corrected favorably. Moreover, in the electronic image pickup apparatus, by using the abovementioned image forming optical system, it is possible to realize high-speed focusing, reduction of consumption of electric power, and sharpening of image.

What is claimed is:

1. An image forming optical system comprising in order from an object side:
a first lens group G1 having a positive refractive power;
a second lens group G2 having a negative refractive power;
an aperture stop;
a third lens group G3 having a positive refractive power; and
a fourth lens group G4 having a negative refractive power, wherein at the time of zooming, air distances between the lens groups are variable, and an air lens nearest to an image side in the third lens group G3 has a shape of a convex lens, and the fourth lens group G4 comprises one lens component, and is movable even at the time of focusing, and satisfies the following conditional expressions $$0.5 < (R4F + R4R)/(R4F - R4R) < 8.0 \quad (1)$$

$$-12.0 < (R4LAF + R4LAR)/(R4LAF - R4LAR) < -2.0 \quad (2)$$

where,

R4F denotes a radius of curvature on an optical axis of a surface nearest to an object side of the fourth lens group G4, R4R denotes a radius of curvature on an optical axis of a surface nearest to an image side of the fourth lens group G4, R4LAF denotes a radius of curvature on an optical axis of a surface on the object side of a positive lens LA which is cemented to the fourth lens group G4, and R4LAR denotes a radius of curvature on an optical axis of a surface on the image side of the positive lens LA which is cemented to the fourth lens group G4.

2. The image forming optical system according to claim 1, wherein a surface on the object side of the air lens nearest to the image side of the third lens group G3 is let to have a convex shape with a large curvature, and furthermore satisfies the following conditional expression $$-8.0 < (R3ALF + R3ALR)/(R3ALF - R3ALR) < -0.3 \quad (3)$$

where,

R3ALF denotes a radius of curvature on an optical axis of a surface on the object side of the air lens nearest to the image side of the third lens group G3, and R3ALR denotes a radius of curvature on an optical axis of a surface on the image side of the air lens nearest to the image side of the third lens group G3.

3. The image forming optical system according to claim 1, wherein
the fourth lens group G4 comprises a cemented lens component in which a plurality of lenses including the positive lens LA are cemented, and
in a rectangular coordinate system in which, a horizontal axis is let to be vd and a vertical axis is let to be nd, when a straight line expressed by $$nd = a \times vd + b \text{ (provided that } a = -0.0267)$$

is set, nd and vd of the positive lens LA are included in an area which is determined by a straight line when it is a lower limit value of a range of the following conditional expression (4) and a straight line when it is an upper limit value of the range of the following conditional expression (4), and an area determined by the following conditional expression (5)

$$2.00 < b < 2.40 \text{ (provided that } nd > 1.45) \quad (4)$$

$$vd < 26.0 \quad (5)$$

where, vd denotes Abbe's number (ndA−1)/(nFA−nCA) for the positive lens LA, and ndA, nCA, nFA denote refractive indices of the positive lens LA for a d-line, a C-line, and an F-line respectively.

4. The image forming optical system according to claim 1, wherein
the fourth lens group G4 comprises a cemented lens component in which a plurality of lenses including the positive lens LA are cemented, and in a rectangular coordinate system in which, a horizontal axis is let to be νd and a vertical axis is let to be θgF, when a straight line expressed by $$\theta gF = \alpha \times \nu d + \beta \text{ (provided that } \alpha = -0.00566\text{)}$$

is set, θgF and νd of the positive lens LA in the fourth lens group G4 are included in both areas namely, an area determined by a straight line when it is a lower limit value of a range of the following conditional expression (6) and a straight line when it is an upper limit value of the range of the following conditional expression (6), and an area determined by the following conditional expression (5)

$$0.7200 < \beta < 0.8300 \tag{6}$$

$$\nu d < 26 \tag{5}$$

where,
θgF denotes a partial dispersion ratio (ngA−nFA)/(nFA−nCA) of the positive lens LA,
νd denotes Abbe's number (ndA−1)/(nFA−nCA) of the positive lens LA, and
ndA, nCA, nFA, and ngA denote refractive indices of the positive lens LA for a d-line, a C-line, an F-line, and a g-line respectively.

5. The image forming optical system according to claim 4, wherein
in a rectangular coordinate system other than the rectangular coordinate system with νd as a horizontal axis and θgF as a vertical axis, in which, the horizontal axis is let to be νd and the vertical axis is let to be θgh, when a straight line expressed by $$\theta hg = \alpha hg \times \nu d + \beta hg \text{ (provided that } \alpha hg = -0.00834\text{)}$$

is set, θhg and νd of the positive lens LA in the fourth lens group G4 are included in both areas namely, an area determined by a straight line when it is a lower limit value of a range of the following conditional expression (7) and a straight line when it is an upper limit value of the range of the following conditional expression (7), and an area determined by the following conditional expression (5)

$$0.7600 < \beta hg < 0.9000 \tag{7}$$

$$\nu d < 26 \tag{5}$$

where,
θhg(LA) denotes a partial dispersion ratio (nhA−ngA)/(nFA−nCA) of the positive lens LA, and
nhA denotes a refractive index of the positive lens LA for an h-line.

6. The image forming optical system according to claim 1, wherein the fourth lens group G4 comprises a cemented lens component in which two lenses namely, the positive lens LA and a negative lens LB are cemented.

7. The image forming optical system according to claim 1, wherein
when a lens having a negative value of a paraxial focal length is let to be a negative lens, a lens LB to which the positive lens LA is to be cemented is a negative lens, and satisfies the following conditional expression $$0.000 \leq \theta gF(LA) - \theta gF(LB) \leq 0.200 \tag{8}$$

where,
θgF(LA) denotes a partial dispersion ratio (ngA−nFA)/(nFA−nCA) of the positive lens LA,
θgF(LB) denotes a partial dispersion ratio (ngB−nFB)/(nFB−nCB) of the lens LB which is to be cemented, and
ndB, nCB, nFB, and ngB denotes refractive indices of the lens LB for a d-line, a C-line, an F-line, and a g-line respectively.

8. The image forming optical system according to claim 1, wherein
when a lens having a negative value of a paraxial focal length is let to be a negative lens, a lens LB to which the positive lens LA is to be cemented is a negative lens, and (the negative lens) satisfies the following conditional expression $$0.000 \leq \theta hg(LA) - \theta hg(LB) \leq 0.300 \tag{9}$$

where,
θhg(LA) denotes a partial dispersion ratio (nhA−ngA)/(nFA−nCA) of the positive lens LA, and
θhg(LB) denotes a partial dispersion ratio (nhB−ngB)/(nFB−nCB) of the lens LB which is to be cemented.

9. The image forming optical system according to claim 7, wherein
when a lens having a negative value of a paraxial focal length is let to be a negative lens, a lens LB to which, the positive lens LA is to be cemented is a negative lens, and (the negative lens) satisfies the following conditional expression $$\nu d(LA) - \nu d(LB) \leq -15 \tag{10}$$

where,
νd(LA) denotes Abbe's number (ndA−1)/(nFA−nCA) of the positive lens LA, and
νd(LB) denotes Abbe's number (ndB−1)/(nFB−nCB) of the lens LB which is to be cemented.

10. An electronic image pickup apparatus comprising:
an image forming optical system according to claim 1;
an electronic image pickup element; and
an image processing unit which processes image data which has been obtained by picking up an image formed by the image forming optical system by the electronic image pickup element, and outputs as image data in which a shape of the image has been changed, wherein the image forming optical system is a zoom lens, and the zoom lens satisfies the following conditional expression at the time of focusing at an object point which is infinite distance, $$0.70 < y_{07}/(fw \cdot \tan \omega_{07w}) < 0.96 \tag{13}$$

where,
$y_{07}$ is expressed as $y_{07} = 0.7 \cdot y_{10}$, when a distance (the maximum image height) from a center up to the farthest point on an effective image pickup surface (on a surface on which an image can be picked up) of the electronic image pickup element is let to be $y_{10}$,
$\omega_{07w}$ is an angle with respect to an optical axis in an object-point direction corresponding to an image point from a center on the image pickup surface up to a position of $y_{07}$, at a wide angle end, and
fw is a focal length of the overall image forming optical system at the wide angle end.

* * * * *